(12) United States Patent
Ushiro et al.

(10) Patent No.: US 11,148,707 B2
(45) Date of Patent: Oct. 19, 2021

(54) STEERING DEVICE

(71) Applicant: HITACHI AUTOMOTIVE SYSTEMS, LTD., Hitachinaka (JP)

(72) Inventors: Yuta Ushiro, Atsugi (JP); Mitsuaki Nakada, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 239 days.

(21) Appl. No.: 16/558,663

(22) Filed: Sep. 3, 2019

(65) Prior Publication Data
US 2020/0070872 A1 Mar. 5, 2020

(30) Foreign Application Priority Data

Sep. 4, 2018 (JP) .............................. JP2018-164990

(51) Int. Cl.
| | |
|---|---|
| *B62D 5/04* | (2006.01) |
| *B62D 15/02* | (2006.01) |
| *B62D 6/00* | (2006.01) |
| *B60W 10/20* | (2006.01) |
| *B62D 5/00* | (2006.01) |

(52) U.S. Cl.
CPC ............... *B62D 5/04* (2013.01); *B62D 6/002* (2013.01); *B62D 15/021* (2013.01); *B60W 10/20* (2013.01); *B60W 2510/20* (2013.01); *B62D 5/005* (2013.01); *B62D 5/0457* (2013.01); *B62D 6/008* (2013.01)

(58) Field of Classification Search
CPC ........ B62D 5/04; B62D 15/021; B62D 6/002; B62D 5/0457; B62D 5/0481; B62D 5/005; B62D 6/008; B60W 10/20; B60W 2510/20

See application file for complete search history.

(56) References Cited

U.S. PATENT DOCUMENTS

| | | | | |
|---|---|---|---|---|
| 2008/0067960 | A1* | 3/2008 | Maeda | B62D 5/046 318/400.02 |
| 2018/0178832 | A1* | 6/2018 | Minaki | H02P 6/16 |
| 2018/0257704 | A1* | 9/2018 | Minaki | B62D 5/0463 |
| 2020/0039579 | A1* | 2/2020 | Fujita | B62D 5/0481 |

FOREIGN PATENT DOCUMENTS

| | | |
|---|---|---|
| JP | 2008-273263 | 11/2008 |
| JP | 2018-122821 | 8/2018 |

\* cited by examiner

*Primary Examiner* — Kevin Hurley
*Assistant Examiner* — Marlon A Arce
(74) *Attorney, Agent, or Firm* — Foley & Lardner LLP

(57) ABSTRACT

A steering device includes: a turning actuator drive command signal output section to output the turning actuator drive command signal, a turning actuator drive command signal including a drive command signal, and a test drive command signal, the drive command signal being outputted to the turning actuator when the vehicle is in a first state, the test drive command signal being outputted to the turning actuator when the vehicle is in a second state, the turning actuator operation signal input section to receive a signal relating to the operation of the turning actuator, and the abnormality diagnosis section to judge whether or not the steering device is in an abnormal state, based on the signal relating to the operation of the turning actuator with respect to the test drive command signal.

25 Claims, 15 Drawing Sheets

STEERING DEVICE

BACKGROUND

The present invention relates to a steering device mounted on a vehicle, and more specifically to a steering device having an abnormality diagnosis function to judge whether or not there is an abnormal state by sensing a malfunction or an abnormality of the steering device.

A Japanese Patent Application Publication No. 2008-273263 discloses an electric power steering device arranged to sense a rotation angle, a rotation direction, and a rotation torque of a steering shaft, to rotate an electric motor based on these sensed signals, to transmit the rotation of the electric motor to a nut, to drive a turning shaft received within the nut, and to assist a steering shaft, in addition to the drive of the turning shaft by the steering shaft rotated by a steering wheel.

A Japanese Patent Application Publication No. 2018-122821 discloses a power steering device of a steer-by-wire type in which a steering shaft is separated from a turning shaft, in which a rotation angle, a rotation direction, and a rotation torque of the steering shaft are sensed, and in which the turning shaft is driven by controlling the rotation of the electric motor based on the sensed signals. In this steering device, the electric motor is a direct coupled motor.

Moreover, there is known an automatic driving device arranged to sense a marker (for example, a white line representing a traveling lane) laid on a traveling road for automatically driving a vehicle, and to control a turning shaft by controlling an electric motor in accordance with information of the marker. Furthermore, there is proposed an automatic driving device which does not include a steering wheel, and a steering shaft, and which is arranged to control a turning shaft only by an electric motor, and thereby to perform the automatic driving.

SUMMARY

In the above-described steering devices, when a malfunction and an abnormality (hereinafter, both referred to as abnormality) are generated in the steering device, an operation reliability of the steering device may be decreased. Accordingly, it is important to perform an initial abnormality diagnosis mode to diagnose whether or not the abnormality is generated in the steering device before the vehicle travels.

In the conventional initial abnormality diagnosis mode, in a static state at a timing at which a power source voltage is supplied to a controller configured to control the steering device, it is judged whether or not the abnormality is generated in the controller. However, it is not possible to sense operation abnormalities of an electric motor, and mechanism components constituting a turning actuator of the steering device. Accordingly, it is desired to perform the initial abnormality diagnosis mode including at least diagnosis of the operation abnormality of the turning actuator.

It is, therefore, an object of the present invention to provide a power steering device devised to solve the above-described problems, and to perform an abnormality diagnosis including at least an operation abnormality of an electric motor, and mechanism components constituting a turning actuator.

According to one aspect of the present invention, a steering device comprises: a turning mechanism including a turning member, and a turning actuator arranged to turn steered wheels of a vehicle through the turning member based on a turning actuator drive command signal; a controller including a turning actuator drive command signal output section, a turning actuator operation signal input section, and an abnormality diagnosis section, the turning actuator drive command signal output section being configured to output the turning actuator drive command signal, the turning actuator drive command signal including a drive command signal for the turning, and a test drive command signal for an abnormality detection, the drive command signal being outputted to the turning actuator to turn the steered wheels when the vehicle is in a first state, the test drive command signal being outputted to the turning actuator to turn the steered wheels when the vehicle is in a second state, the turning actuator operation signal input section being configured to receive a signal relating to the operation of the turning actuator, and the abnormality diagnosis section being configured to judge whether or not the steering device is in an abnormal state, based on the signal relating to the operation of the turning actuator with respect to the test drive command signal.

DETAILED DESCRIPTION

Hereinafter, steering devices according to embodiments of the present invention are explained with reference to the drawings. However, the present invention is not limited to the below-described embodiments.

Before explanations of the embodiments of the present invention, configurations of power steering devices to which the present invention is applicable are explained.

Figure 1:
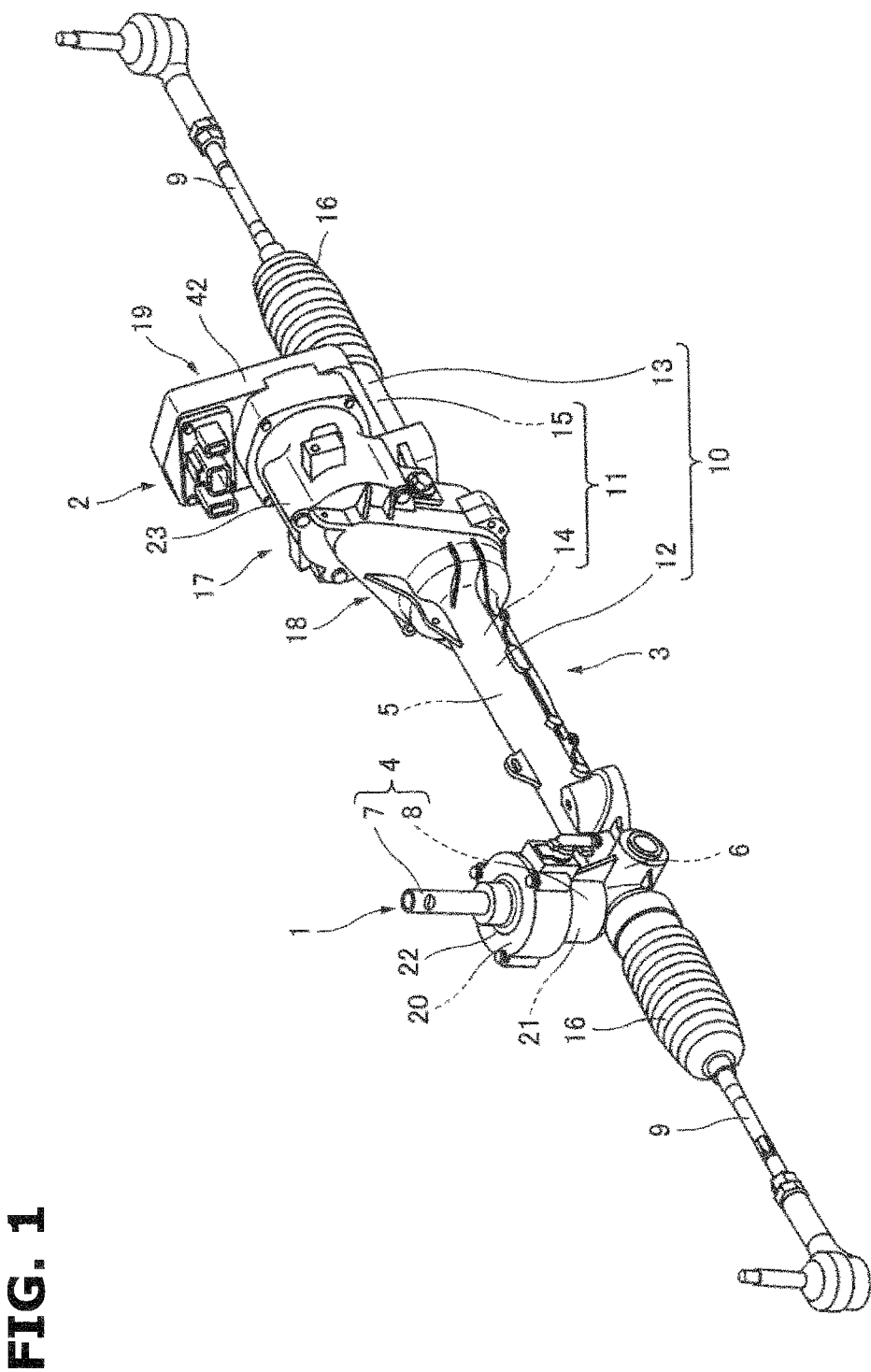
FIG. 1 is a perspective view showing an outer profile of a steering device according to a first embodiment of the present invention.
Figure 2:
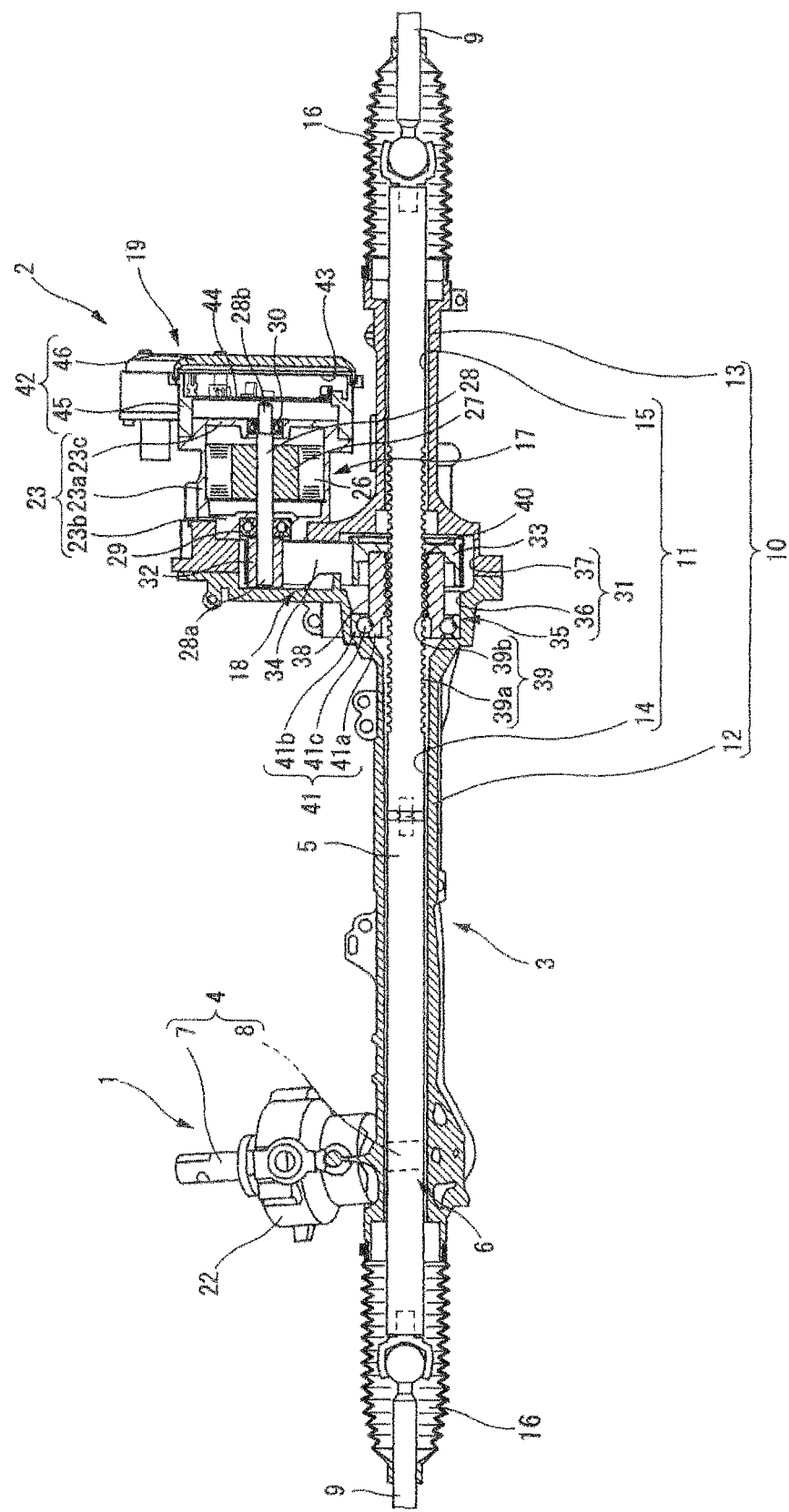
FIG. 2 is a vertical sectional view showing the steering device of FIG. 1.

FIG. 1 and FIG. 2 show a power steering device arranged to sense a rotation angle, a rotation direction, and a rotation torque of a steering shaft, to rotate an electric motor based on these sensed signals, to transmit the rotation of the electric motor to a nut, to drive a turning shaft received within the nut, and to assist a steering shaft, in addition to the drive of the turning shaft by the steering shaft rotated by a steering wheel.

A steering mechanism 1 includes a steering shaft 4 connected to a steering wheel (not shown) disposed within a cabin of a vehicle; a rack bar 5 which is a turning shaft linked with the steering wheel; and a conversion mechanism 6 arranged to link the steering shaft 4 and the rack bar 5. The conversion mechanism 6 is a rack and pinion mechanism including a pinon teeth (not shown) formed on an outer circumference of the steering shaft 4; and a rack teeth (not shown) formed on an outer circumference of the rack bar 5.

The rack bar 5 is the turning member. However, the turning member may be a pitman arm in addition to the rack bar 5. Moreover, the turning member is not limited to these. The turning member may be a link mechanism provided between the turning actuator and the steering wheel, and so on.

The steering shaft 4 includes an input shaft 7 including a first axial end portion connected to the steering wheel to rotate as a unit with the steering wheel; and an output shaft 8 including a first axial end portion connected through a torsion bar (not shown) to a second axial end portion of the input shaft 4.

The rack bar 5 includes both end portions linked through tie rods 9 and a pair of knuckle arms to the pair of the steered wheels. With this, the rack bar 3 is moved in an axial direction so as to pull the knuckle arms through the tie rods 9, so that the directions of the pair of the steered wheels are varied.

Moreover, the rack bar 5 is received in a rack bar receiving portion 11 of a substantially cylindrical rack housing 10 constituting a part of the housing 3 so that both axial end portions of the rack bar 5 are exposed to the outside. The rack bar 5 is arranged to be moved in the axial direction. The rack housing 10 is made by casting. The rack housing 10 has a two divided structure. The rack housing 10 includes a first housing 12 receiving the first axial end portion of the rack bar 5; and a second housing 13 receiving the second axial end portion of the rack bar 5. The rack housing 10 is integrally formed by the first housing 12 and the second housing 13 by being tightened by a plurality of bolts (not shown).

The rack bar receiving portion 11 includes a first rack bar receiving portion 14 penetrating through the first housing 12 in the axial direction; and a second rack bar receiving portion 15 penetrating through the second housing 13 in the axial direction.

Boots 16 are mounted on both axial end portions of the rack housing 10 and the tie rods 9. Each of the boots 16 has a bellows shape. Each of the boots 16 is made from elastic material such as synthetic rubber to ensure flexibility. Each of the boots 16 is arranged to prevent the water, the dust and so on from entering the housing 3.

The steering assist mechanism 2 includes an electric motor 17 which is a drive section arranged to produce the steering assist force; a transmitting mechanism 18 arranged to transmit the drive force of the electric motor 17 to the rack bar 5; various sensors arranged to sense various state amounts of the power steering device; and a controller 19 configured to control and drive the electric motor 17 based on signals outputted from the various sensor. In this case, the electric motor 17 and the transmitting mechanism 18 constitute the turning actuator.

In the various sensors, a steering angle sensor 20 and a torque sensor 21 are received within a sensor housing 22 which is a part of the housing 3, and which is formed to surround the outer circumference of the steering shaft 4. The steering angle sensor 20 is arranged to sense the steering angle which is a rotation amount from a neutral steering angle of the steering wheel. The torque sensor 21 is arranged to sense the torque inputted to the steering shaft 4.

The steering angle sensor 20 is mounted on the outer circumference of the input shaft 7 of the steering shaft 4. The steering angle sensor 20 is arranged to sense a steering angle based on the rotation angle of the input shaft 7. Moreover, the steering angle sensor 20 includes main and sub steering angle sensing portions 20*a* and 20*b* of double system. The steering angle sensing portions 20*a* and 20*b* are arranged to sense the steering angle respectively.

The torque sensor 21 is provided between and across the input shaft 7 and the output shaft 8. The torque sensor 21 is arranged to sense the torque based on a displacement amount of a relative rotation between the input shaft 7 and the output shaft 8. Moreover, the torque sensor 21 includes main and sub torque sensing portions 21*a* and 21*b* of double system. The torque sensing portions 21*a* and 21*b* are arranged to sense the steering torque respectively. Besides, the steering angle sensor 20 and the torque sensor 21 are electrically connected to the controller 19 through a harness (not shown) provided along the outer circumference of the rack housing 10.

The electric motor 17 is a three phase alternating current motor arranged to be driven based on a three phase alternating current power. The electric motor 17 includes a motor housing 23 constituting a part of the housing 3; and a motor element provided within the motor housing 23. The motor housing 23 includes a cylindrical portion 23*a* having a cylindrical hollow shape, and receiving the motor element; and first and second end wall portions 23*b* and 23*c* closing opening portions of the cylindrical portion 23*a*.

The motor element includes a cylindrical stator 26 fixed in the inner circumference surface of the cylindrical portion 23*a* by shrink fitting and so on; a cylindrical rotor 27 disposed on an inner circumference side of the stator 26 with a predetermined radial clearance; and a motor shaft 28 integrally fixed on an inner circumference side of the rotor 27 to rotate as a unit with the rotor 27, and arranged to output the rotation of the rotor 27.

The stator 26 includes a stator core formed by stacking a plurality of thin plates; and U phase coils, V phase coils, and W phase coils wound around the stator core. Besides, in this embodiment, the coils are connected by Y connection (star connection). However, the coils may be connected by delta connection.

The motor shaft 28 includes both first and second end portions 28*a* and 28*b* exposed, respectively, from the motor housing 23 through through holes formed in the first and second end wall portions 23*b* and 23*c* to penetrate through the first and second end wall portions 23*b* and 23*c*. The first end portion 28*a* positioned on a side opposite to the controller 19 extends within a transmitting mechanism receiving portion 31 (described later) receiving the transmitting mechanism 18. On the other hand, the second end portion 28b extends within a receiving portion 43 (described later) receiving the controller 19.

Moreover, the motor shaft 28 is rotatbly supported by a first ball bearing 29 and a second ball bearing 30. The first ball bearing 29 is disposed between an outer circumference of the first end portion 28a, and an inner circumference surface of the through hole of the first end wall portion 23b. The second ball bearing 30 is disposed between an outer circumference surface of the second end portion 28b, and an inner circumference surface of the through hole of the second end wall portion 23c.

The transmitting mechanism 18 is received within the transmitting mechanism receiving portion 31 of the housing 3. The transmitting mechanism 18 includes an input shaft side pulley 32; an output shaft side pulley 33; a belt 34 wound around the both pulleys 32 and 33; and a ball screw mechanism 35 arranged to decrease a speed of the rotation of the output shaft side pulley 33, and to convert this rotation to the axial movement of the rack bar 5.

The transmitting mechanism receiving portion 31 includes a first transmitting mechanism receiving portion 36 provided at an end portion of the first rack bar receiving portion 14 on the second housing 13 side; and a second transmitting mechanism receiving portion 37 provided at an end portion of the second rack bar receiving portion 15 on the first housing 12 side. The transmitting mechanism receiving portion 31 is formed by jointing the first transmitting mechanism receiving portion 36 and the second transmitting mechanism receiving portion 37.

The input side pulley 32 is formed into a cylindrical shape having a relatively small diameter with respect to the output side pulley 33. The input side pulley 32 is fixed, by the press-fit, on the first end portion 28a of the motor shaft 28 of the electric motor 17 through a through hole formed to penetrate through the input shaft side pulley 31.

The output side pulley 33 is disposed on an outer circumference side of the rack bar 5. The output side pulley 33 is linked through the ball screw mechanism 35 to the rack bar 5. In particular, the output side pulley 33 has a bottomed cylindrical shape having a relatively large diameter with respect to the input side pulley 32. The output side pulley 33 is fixed on an outer circumference of a nut 38 (described later) of the ball screw mechanism 35 to rotate as a unit with the nut 38.

The belt 34 is an endless belt in which glass fiber cupper wire, and so on are embedded as core member. The belt 34 is arranged to synchronously rotate the input side pulley 32 and the output side pulley 33, and thereby to transmit the rotation force of the input side pulley 32 to the output side pulley 33.

The ball screw mechanism 35 includes the cylindrical nut 38 disposed on the outer circumference side of the rack bar 5; a ball circulation groove 39 formed between the nut 38 and the rack bar 5; a plurality of balls 40 provided within the ball circulation groove 39 to be rolled within the ball circulation groove 39; and a circulation mechanism (not shown) arranged to circulate the balls 40 from a first end side of the ball circulation groove 39 to a second end side of the ball circulation groove 39.

The nut 38 is rotatably supported through a ball bearing 41 received within the first transmitting mechanism receiving portion 36. The ball bearing 41 includes an inner race portion 41a integrally formed with the nut 38; an outer race portion 41b fixed on an inner circumference surface of the first transmitting mechanism receiving portion 36; and a plurality of balls 41c received between the inner race portion 41a and the outer race portion 41b to be rolled between the inner race portion 41a and the outer race portion 41b. Besides, in this embodiment, the inner race portion 41a and the nut 38 are integrally formed. However, the inner race portion 41a and the nut 38 may be formed by different members.

The ball circulation groove 39 includes a shaft side ball screw groove 39a which is a helical groove provided on the outer circumference side of the rack bar 5; and a nut side ball screw groove 39b which is a helical groove provided on the inner circumference side of the nut 38.

The controller 19 includes a control housing 42 constituting a part of the housing 3; and a control substrate 44 received in a receiving portion 43 of the control housing 42.

The control housing 42 includes a cylindrical body 45 including a first end portion which is on the electric motor 17 side, and which covers the outer circumference of the motor housing 23; and a cover 46 closing an opening portion which is on the second end portion side of the body 45.

The control substrate 44 includes a substrate made from nonconductive resin material such as glass epoxy resin; and conductive patterns formed both surfaces of the substrate, and on which a plurality of electronic components and a plurality of electric components are mounted.

A motor rotation angle sensor (not shown in FIG. 2) is provided on the control substrate 44. The motor rotation angle sensor is one of the various sensors which is arranged to sense the motor rotation angle that is a rotation angle of the rotor 27 of the electric motor 17.

This motor rotation angle sensor is arranged to sense the rotation angle of the motor shaft 28 (the rotor 27) based on a variation of magnetic field generated by magnets (not shown) mounted on the second end portion 28b of the motor shaft 28. Moreover, the motor rotation angle sensor includes main and sub motor rotation angle sensing portions of double system. The main and bus motor rotation angle sensing portions are arranged to sense the rotation angle of the motor shaft 28 respectively.

Next, a power steering device of a steer-by-wire type is explained. In this power steering device of the steer-by-wire type, the steering shaft is separated from the turning shaft. The rotation angle, the rotation direction, and the rotation torque of the steering shaft are sensed. The turning shaft is driven by controlling the drive force of the electric motor based on the sensed signals. Besides, the steering assist mechanism 2 is identical to that of FIG. 1 and FIG. 2.

Figure 3:
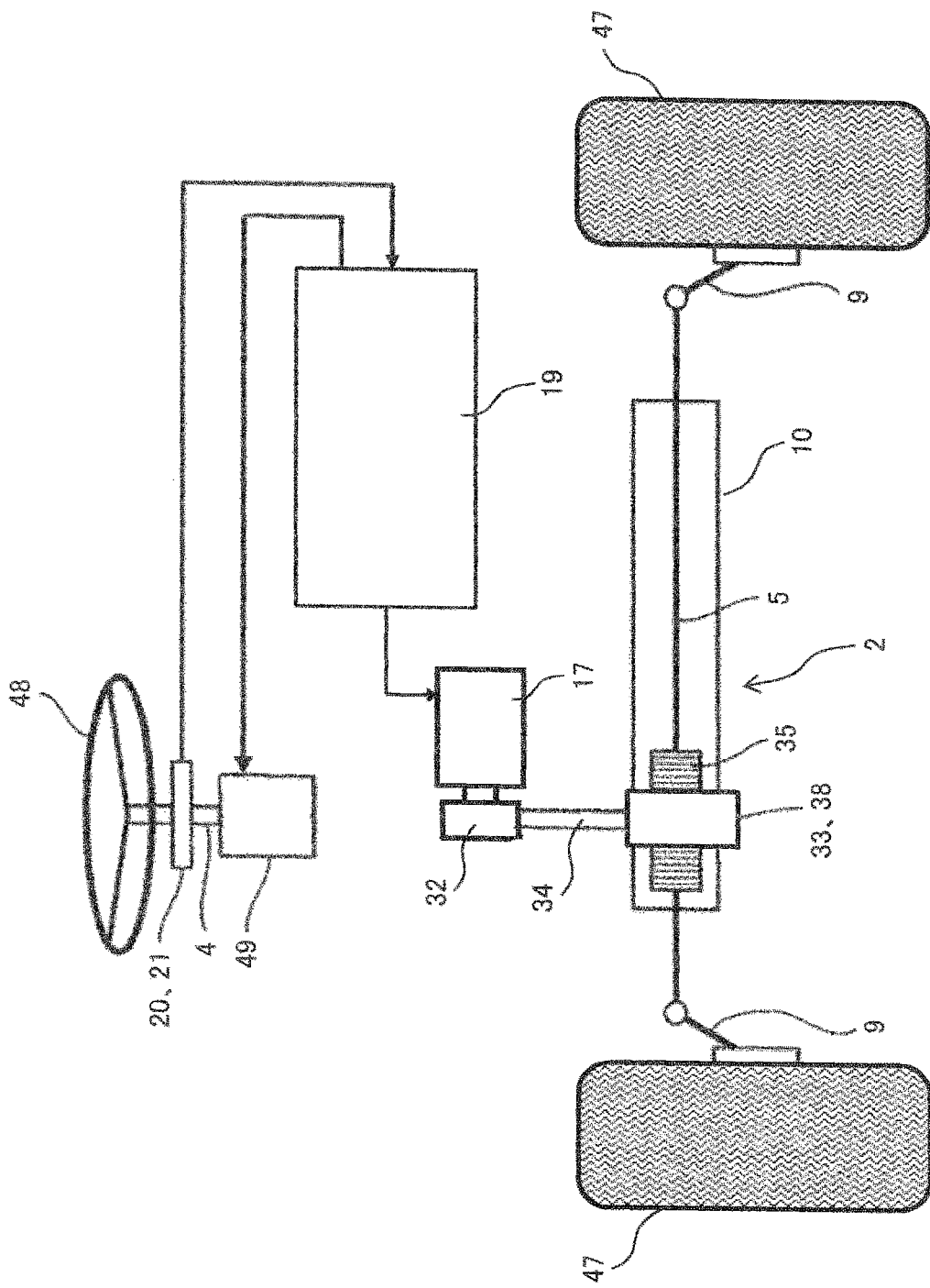
FIG. 3 is a configuration view showing a configuration of a steering device according to a second embodiment of the present invention.

In FIG. 3, steered wheels 47 are arranged to be turned by the tie rods 9. A steering wheel 48 is connected to the steering shaft 4. The steering angle sensor 20 and the torque sensor 21 are provided to the steering shaft 4. In this case, the steering shaft 4 is not linked to the rack bar 5. A steering reaction force motor 49 is provided at a tip end of the steering shaft 4.

The steering angle sensor 20 is arranged to sense the steering angle of the steering shaft 4. The torque sensor 21 is arranged to sense the torque acted to the steering shaft 4. The steering reaction force motor 49 is an electric motor arranged to provide the reaction force to the steering shaft 4. By monitoring the input of the torque sensor 21 through the controller 19, the steering reaction force motor 49 is arranged to provide the predetermined reaction torque.

Accordingly, the rotation of the steering wheel 48 is sensed as the angle signal and the torque signal by the steering angle sensor 20 and the torque sensor 21. These sensed signals are inputted to the controller 19. The controller 19 is configured to calculate the control amount of the electric motor 17 based on the inputted angle signal and the inputted torque signal, and to drive the electric motor 17. The rotation of the electric motor 17 rotates the output side pulley 33 from the input side pulley 32 through the belt 34. Then, the nut 38 drives the rack bar 5 to turn (steer) the vehicle.

In this case, the steering reaction motor 49 has a "steering input mechanism actuator" to control the rotation position of the steering wheel 48, in addition to the provision of the reaction torque. That is, the steering reaction force motor 49 is configured to rotate the steering shaft 4 by the control signal from the controller 19. For example, after the turning actuator turns the steered wheels 47 by a test drive command signal described later, independently of the steering wheel 48, the steering reaction motor 49 is configured to align the steered angle (turning angle) of the steered wheels 47 and the steering angle of the steering shaft 4.

Besides, the steering mechanism 1 shown in FIG. 1 to FIG. 3 is mounted to the only front wheels of the vehicle. However, the steering assist mechanism 2 may be mounted to the rear wheels of the vehicle. Accordingly, it is possible to turn the rear wheels by the electric motor 17 and the ball screw mechanism 35, in addition to the front wheels of the vehicle.

Figure 4A:
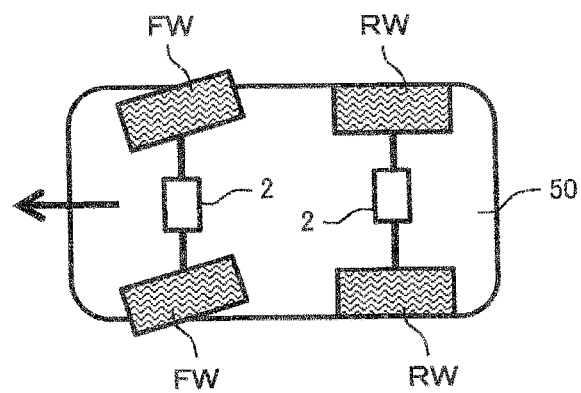
FIG. 4A is an explanation view for explaining a steered state of only front wheels in a vehicle in which the steering devices are provided to the front wheels and rear wheels.
Figure 4B:
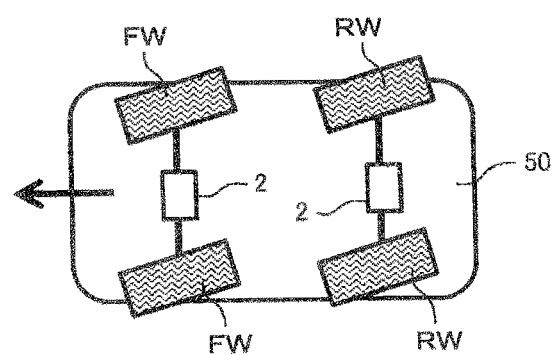
FIG. 4B is an explanation view for explaining a first steered state of the front wheels and the rear wheels in the vehicle in which the steering devices are provided to the front wheels and rear wheels.
Figure 4C:
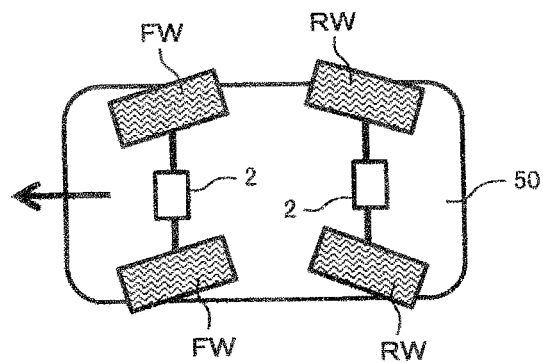
FIG. 4C is an explanation view for explaining a second steered state of the front wheels and the rear wheels in the vehicle in which the steering devices are provided to the front wheels and rear wheels.

FIG. 4A to FIG. 4C show control states of the front wheels FW and the rear wheels RW with respect to a vehicle body 50. Arrows in FIG. 4A to FIG. 4C represent traveling directions of the vehicle. FIG. 4A shows a state in which the only front wheels FW are turned. This configuration is a general configuration. FIG. 4B shows a same phase method in which the front wheels FW and the rear wheels RW are turned in the same direction. This same phase method can suppress the yaw generated at the turning to improve the stability of the vehicle. Moreover, it is possible to suppress the sideslip (skidding) at the lane change and so on in the high vehicle speed region. Moreover, FIG. 4C shows an opposite phase method in which the front wheels FW and the rear wheels RW are turned in opposite directions. This opposite phase method can decrease the rotation radius. Accordingly, it is possible to improve the small turning characteristic.

As described above, the power steering device specifically shown in FIG. 3 is applicable to the rear wheels RW, in addition to the front wheels FW.

Next, a configuration of the controller 19 configured to control the electric motor 17 constituting the turning actuator used in the steering device is explained.

Figure 5:
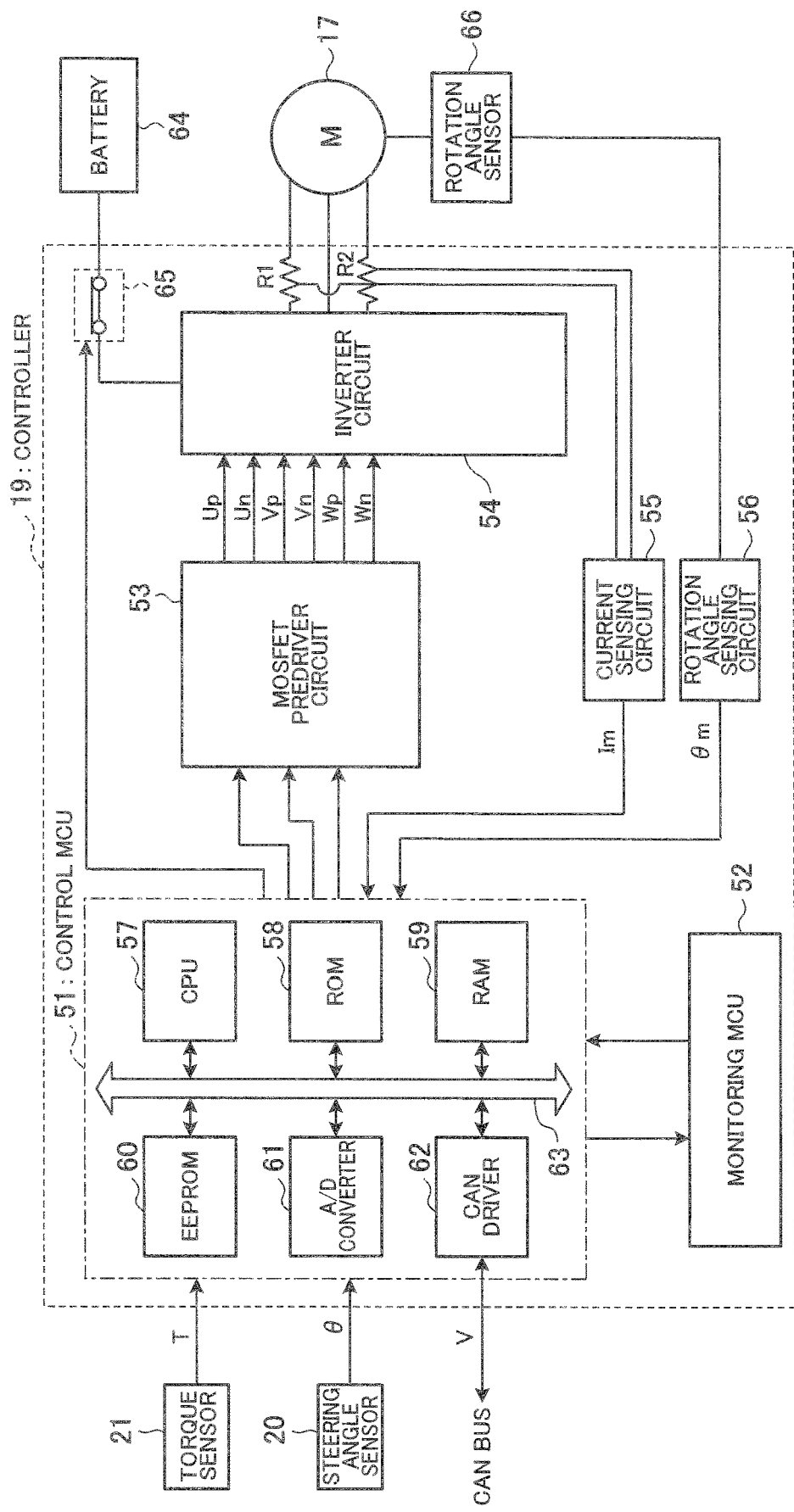
FIG. 5 is a configuration diagram showing a controller configured to control an electric motor constituting a turn actuator.

FIG. 5 shows a hardware configuration of the controller 19 of FIG. 1 and FIG. 3. As shown in FIG. 5, the controller 19 includes a control micro control unit (control MCU) 51; a monitoring micro control unit (monitoring MCU) 52; a MOSFET predriver circuit 53; an inverter drive circuit 54 which is the motor drive circuit; a current sensing circuit 55; a rotation angle sensing circuit 56, and so on.

The control micro control unit 51 includes a CPU 57 which is a calculating device, a ROM 58, a RAM, 59, and an EEPROM (flash ROM) 60 which are memories; an A/D converter 61; an CAN driver 62; a bus line 63, and so on.

The CPU 57 is configured to perform various programs stored in the ROM 58, and to control the electric motor 17 of the power steering device. Accordingly, the operation performed by the program is a control function.

The ROM 58 stores the various programs performed by the CPU 57. In particular, the ROM 58 stores a control program for performing the motor control process (turning process) to control the electric motor 17. Moreover, the ROM 58 stores a diagnosis program for performing the diagnosis of the power steering device. The control program and the diagnosis program are for performing a control function and a diagnosis function by the CPU 57.

The RAM 59 is configured to be used as a work area when the CPU 57 performs the control program, and to temporarily store data necessary for the processing process, and the processing result. Similarly, the RAM 59 is configured to perform the diagnosis program, and to temporarily store the diagnosis result as the error code.

The EEPROM 60 is a memory to retain the storage content after the power interruption. The EEPROM 60 is configured to store the hardware characteristic correction value, and the error code after performing the diagnosis function. In this case, the shutdown of the controller 19 is delayed only during a time period during which the error code is transferred from the RAM 59 to the EEPROM 60, by the shutoff function by which the supply of the power source voltage is shut off.

The A/D converter 61 is configured to receive the steering angle information 9 from the steering angle sensor 20, the torque information T from the torque sensor 21, the current information Im of the electric motor 17 from the current sensing circuit 55, the motor rotation angle information θ$m$ from the rotation angle sensing circuit 56, and so on, and to convert to digital signals.

The CAN driver 62 is connected to a CAN bus. The CAN driver 62 is an interface for CAN communication with the other controllers and the sensors through the CAN bus. For example, the CAN driver 62 is configured to receive the vehicle speed V (the vehicle speed pulse) from the vehicle speed sensor.

The MOSFET predriver circuit 53 is configured to convert the PWM control signals of the respective phases of the U phase, the V phase, and the W phase which are inputted from the control micro control unit 51, to positive and negative energization signals (Up, Un, Vp, Vn, Wp, Wn) of the respective phases, and to output to the inverter drive circuit 54.

The inverter drive circuit 54 includes bridge circuits for three phases of the U phase, the V phase, and the W phase. Each of the bridge circuits includes a pair of MOSFET switching elements. In each of the MOSFET switching elements, reflux diodes are connected in parallel.

The direct current voltage is applied to each of the bridge circuits from the battery 64 through the power source relay 65. The energization signal is inputted from the MOSFET predriver circuit 53 to a control terminal (gate terminal) of each of the MOSFET switching elements.

The direct current voltage applied to the inverter drive circuit 54 is converted the three phase alternating current voltages by the switching operation of the MOSFET switching elements in the inverter drive circuit 54, so as to drive the electric motor 17. Shunt resistors R1 and R2 are connected to the bridge circuits.

The current sensing circuit 55 is connected to the shunt resistors R1 and R2. The current sensing circuit 55 is configured to sense the current information Im of the electric motor 17, and to output to the A/D converter 61. Moreover, the rotation angle sensing circuit 56 is configured to output, as the motor rotation angle information θm, the output signal from the motor rotation angle sensor 66 arranged to sense the motor rotation angle which is the rotation angle of the rotor of the electric motor 17, to the A/D converter 61. This motor rotation angle sensor 66 includes main and sub motor rotation angle sensing portions of double system. The main and sub motor rotation angle sensing portions are arranged to sense the rotation angle of the motor shaft 28 respectively.

The monitoring micro control unit 52 includes a CPU, a ROM, a RAM, a D/A converter, an A/D converter, an interface (not shown), and so on. The monitoring micro control unit 52 is configured to monitor runway of the CPU 57 of the control micro control unit 51.

Next, the initial abnormality diagnosis mode performed in the controller 19 is explained. As described above, the initial abnormality diagnosis mode is performed by the diagnosis program. This diagnosis program is understood as the function, and as the control block.

Besides, a below-described steering device is the power steering device of the steer-by-wire type in which the steering shaft is separated from the turning shaft, in which the rotation angle, the rotation direction, and the rotation torque of the steering shaft are sensed, and in which the turning shaft is driven by controlling the drive force of the electric motor based on the sensed signals, as shown in FIG. 3.

In FIG. 3, the steering input mechanism is the steering wheel 48. However, the steering input mechanism may be other steering mechanisms such as a joystick and a steering button.

Figure 6:
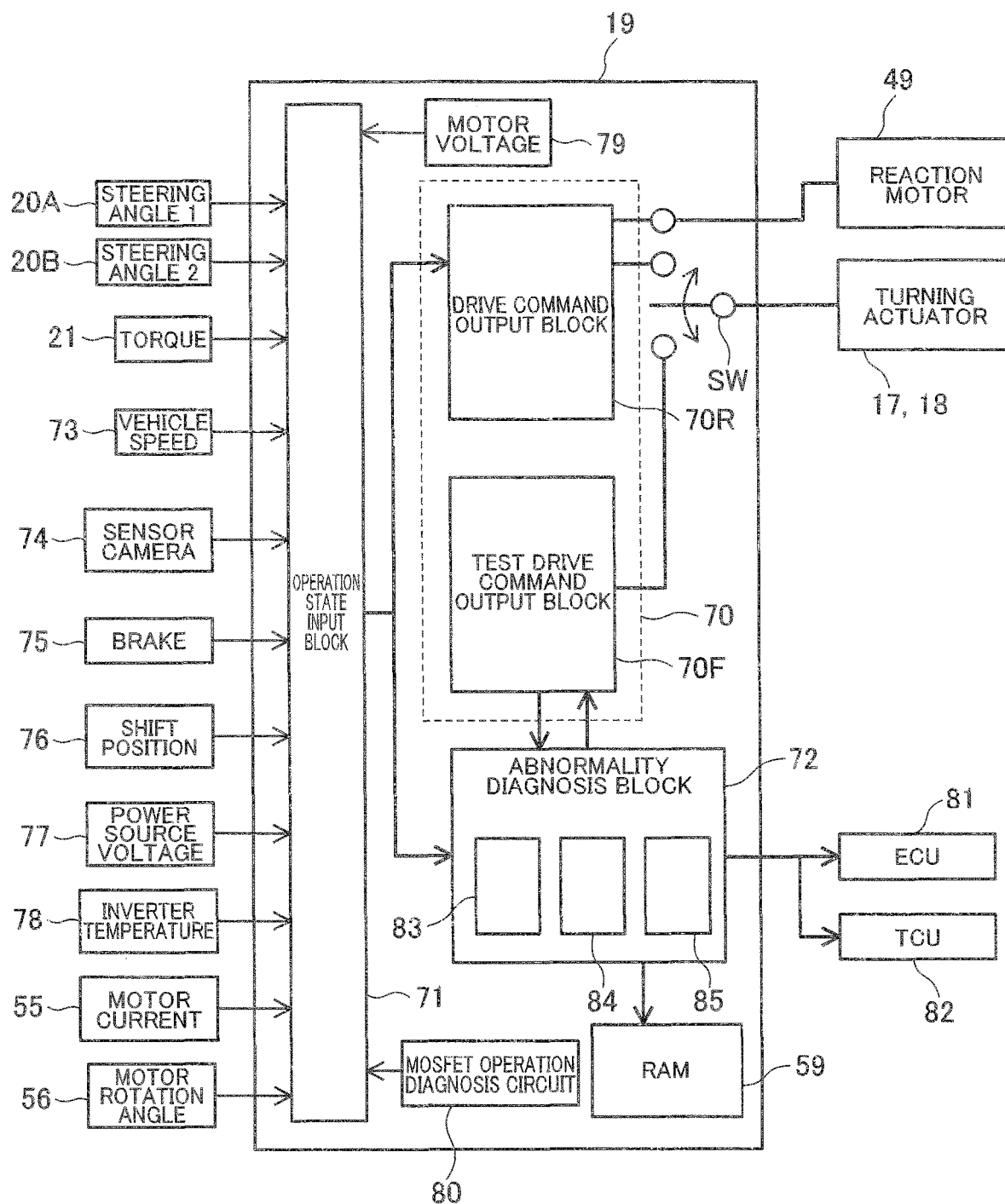
FIG. 6 is a block diagram showing a configuration of main parts of the controller according to the embodiments of the present invention.

In this embodiment according to the present invention, the controller 19 includes a turning actuator drive command signal output block 70; a turning actuator operation state signal input block 71; and an abnormality diagnosis block 72, as shown in FIG. 6.

Moreover, the turning actuator drive command signal output block 70 includes a drive command output block 70R configured to output a regular (normal) drive command signal to perform the normal steering function; and a test drive command output block 70F configured to output a test drive command signal for sensing the abnormality to perform the abnormality diagnosis function.

Furthermore, the abnormality diagnosis block 72 includes an obstacle recognition block (obstacle sensing section) 83; a drive circuit abnormality diagnosis block 84; and an electric motor abnormality diagnosis block 85. Besides, it is possible to add other abnormality diagnosis section if necessary. These are performed by the diagnosis program to perform the diagnosis function.

The drive command output block 70R and the test drive command output block 70F are switched by the changeover switch SW. Actually, the judgment step of the diagnosis program selects the control program or the diagnosis program. In this case, the judgment step uses various parameters. This is described later.

The drive command output block 70R is configured to output the regular drive command signal to the electric motor 17 of the turning actuator in a "first state" in which the normal steering operation is performed after the initial abnormality diagnosis mode (described later) is finished. With this, the turning actuator performs the normal steering operation.

In the initial adjustment process described later, the drive command output block 70R is configured to control the steering reaction motor 49 to align the position of the steering wheel 48 to correspond to the neutral steering angle. In this case, the drive command output block 70 is configured to compare the steering angle sensed by the first steering angle sensor 20A, and the neutral steering angle stored in the controller 19, and to rotate the steering wheel 48 to the neutral steering angle by the steering reaction motor 49.

On the other hand, the test drive command output block 70F is configured to output a predetermined test drive command signal to the electric motor 17 of the turning actuator in a "second state" in which the initial abnormality diagnosis mode can be performed. With this, the turning actuator is driven to the predetermined state. It is possible to diagnose the operation abnormality.

The operation state signals from the various sensors and various sensing circuit described later are inputted to the turning actuator operation state signal input block 71.

The first steering angle sensor 20A is configured to sense the rotation angle of the steering wheel 48. The second steered angle sensor 20B is configured to sense the turning angle of the steerred wheel 47. In this way, the first steering angle sensor 20A and the second steered angle sensor 20B are provided for aligning the rotation angle of the steering shaft 48 and the steered angle (turning angle) of the steered wheels 47 after the turning actuator is driven by the test drive command signal, independently of the steering wheel 48.

The torque sensor 21 is configured to sense the steering torque of the steering wheel 48. The current sensing circuit 55 is configured to sense the coil current of the electric motor 17. The rotation angle sensing circuit 56 is configured to sense the rotation angle of the rotor of the electric motor 17.

A vehicle speed sensor 73 is arranged to sense the traveling vehicle speed of the vehicle, and thereby to sense whether or not the vehicle is stopped. A sensor camera 74 is arranged to sense the obstacle around the wheels, and to sense whether or not there is the obstacle when the wheels is turned by the test drive command signal. A brake sensor 75 and a shift position sensor 76 are arranged to auxiliarily sense whether or not the vehicle is stopped.

A power source voltage sensor 77 is arranged to sense whether or not the power source voltage is sufficiently high when the test drive command signal is outputted. Moreover, a temperature sensor 78 is, for example, a thermistor arranged to sense the temperature of the inverter drive circuit 54.

Moreover, the controller 19 includes a voltage sensing circuit 79 arranged to sense the voltage applied to the electric motor 17. This sensed voltage is used for the abnormality diagnosis in the internal circuit. Furthermore, the inverter drive circuit 54 includes a MOSFET operation diagnosis circuit 80 configured to sense the ON/OFF state of each of the MOSFETs. The MOSFET operation diagnosis circuit 80 has a function to sense the abnormality in which the operation of the MOSFET is in the OFF state although the operation of the MOSFET is in the ON state in the regular operation, and the abnormality in which the operation of the MOSFET is in the ON state although the operation of the MOSFET is in the OFF state in the regular operation The operation state signals of the various sensors inputted to the turning actuator operation state signal input block 71 are inputted to the drive command output block 70R and the abnormality diagnosis block 72.

The drive command output block 70R is configured to output a regular drive command signal to perform the normal steering function based on the inputted operation state signal. In this case, the changeover switch SW is arranged to connect the drive command output block 70R and the turning actuator.

On the other hand, the abnormality diagnosis block 72 is configured to perform the abnormality diagnosis function based on the inputted operation state signals, and to temporarily store the error code representing whether or not there is the abnormality, in the RAM 59. Besides, when the abnormality diagnosis block 72 performs the diagnosis function, the changeover switch SW is arranged to connect the test drive command output block 70F and the turning actuator.

In this case, the initial abnormality diagnosis mode is performed in the "second state". This "second state" is a state where the vehicle is stopped, before a predetermined time period is elapsed or the traveling of the vehicle is started, after the power source voltage is supplied to the controller 19 by the operation of the start button or key switch of the vehicle. However, the time period during which the initial abnormality diagnosis mode is performed is not long so that the driver has the unnatural feeling. Accordingly, it is not problematic to perform the initial abnormality diagnosis mode.

In this way, the abnormality diagnosis of the turning actuator to operate the steering wheel is performed before the start of the traveling of the vehicle, not during the traveling of the vehicle. Accordingly, it is possible to suppress the unnatural feeling of the driver, and to improve the reliability of the steering device.

Moreover, it is possible to perform the initial abnormality diagnosis mode in the "second state" before the driver rides on the vehicle. For example, a timing at which it is sensed that the door is unlocked by a remote key, or at a timing at which it is sensed that the door is opened, the initial abnormality diagnosis mode may be performed by suppling the power source voltage to the controller 19 in synchronism with the sensed signals. Then, the initial abnormality diagnosis mode may be finished after the seat sensor senses that the driver occupies the seat.

In this way, the abnormality diagnosis of the turning actuator with the operation of the steering wheel 48 is performed before the driver travels the vehicle. With this, it is possible to suppress the unnatural feeling of the driver.

Moreover, when the abnormality state is sensed, the abnormality diagnosis block 72 is configured to output the abnormality sensing signal to the engine control unit (ECU) 81 and the transmission control unit (TCU) 82. With this, it is possible to perform the control to decrease the output of the engine by the engine control unit 81, and to suppress the change of the shift position by the transmission control unit 82.

In this way, the abnormality information of the steering device is outputted to the other controllers other than the steering device. With this, it is possible to shift the control function of the other controllers to the safety side, and to perform the control to compensate the function decrease due to the abnormality of the steering device by the other controllers.

Next, concrete control flows according to this embodiment are explained with reference to FIG. 7 to FIG. 15. Besides, this control flows show a control performed in the CPU 57 based on the diagnosis program stored in the ROM 58 shown in FIG. 5. These control flows are started at each predetermined time by the comparison match interruption of the free-run counter installed in the CPU 57.

Figure 7:
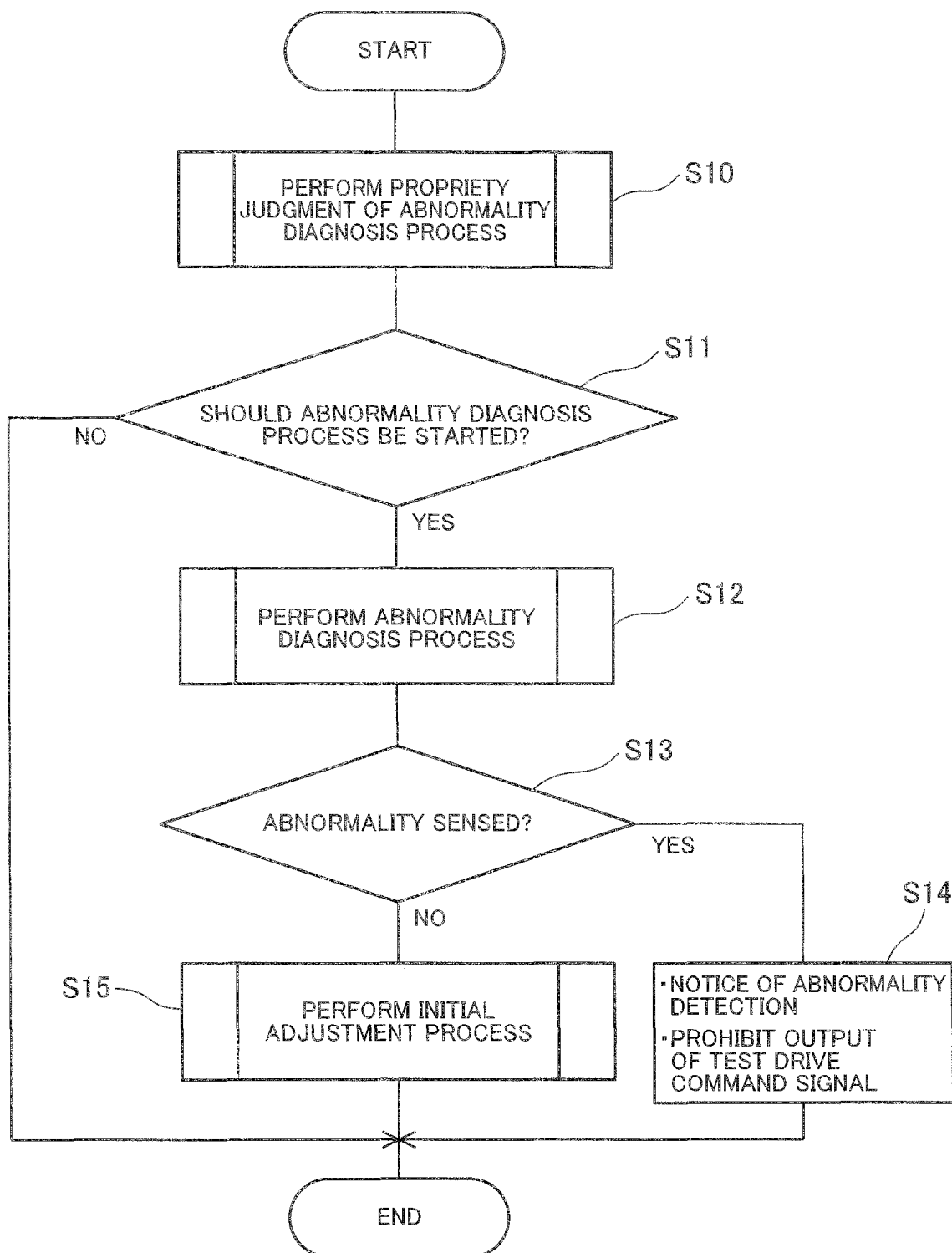
FIG. 7 is a control flowchart performed in an abnormality diagnosis block shown in FIG. 6.

FIG. 7 shows a general flow of the abnormality diagnosis performed in the initial abnormality diagnosis mode. Hereinafter, control steps are explained.

At step S10, it is judged whether or not the initial abnormality diagnosis mode can be performed. That is, it is judged whether or not the vehicle travels, and whether or not the obstacle or the person exists around the wheels. With this, it is judged whether or not the vehicle is in the circumstance in which the initial abnormality diagnosis mode can be performed. The concrete control flow of this judgement is explained in FIG. 8. Accordingly, the explanation is omitted. After it is judged whether or not the vehicle is in the circumstance in which the initial abnormality diagnosis mode can be performed, the process proceeds to step S11.

At step S11, it is judged whether or not the abnormality diagnosis process is started based on the judgment result obtained at step S10. When it is judged that the vehicle is not in the circumstance in which the abnormality diagnosis process is performed, the process proceeds to the end to wait for the next start timing. On the other hand, when it is judged that the vehicle is in the circumstance in which the abnormality diagnosis process is performed, the process proceeds to step S12.

At step S12, the concrete abnormality diagnosis process is performed. This concrete control flow of the abnormality diagnosis process is described later. An important point is that the test drive command output block 72 (cf. FIG. 6) outputs the test drive command signal, and that the abnormality diagnosis is performed in a state where the turning actuator performs a predetermined operation in response to the test drive command signal.

For example, the following diagnosis (1)-(5) are performed in a state where the turning actuator performs the predetermined operation. (1) The abnormality of the circuit voltage of the circuit constituting the controller 19 is monitored. (2) The abnormality of the phase current of the electric motor 17 is monitored. (3) The abnormality of the rotation angle of the electric motor 17 is monitored. (4) The abnormality of the operation of the inverter drive circuit is monitored. (5) The abnormalities of the electric motor and the mechanism components are monitored. These concrete control flows of the abnormality diagnosis are shown in FIG. 9 to FIG. 14. These explanations are omitted. After the above-described abnormality diagnosis process is finished, the process proceeds to step S13.

At step S13, it is judged whether or not the abnormality is sensed by the abnormality diagnosis process of step S12. When at least one abnormality is sensed, the process proceeds to step S14. When the abnormality is not sensed, the process proceeds to step S15.

At step S14, the abnormality sensed at step S13 is notified to the outside by the display, the speaker, and so on. Moreover, this abnormality is stored as the error code in the RAM 59. Furthermore, the abnormality is transferred to and stored in the EFPROM 60 when the engine is stopped. The error code transferred to the EEPROM 60 is read by the read tool to grasp the details of the portion of the abnormality, and so on.

Moreover, when the abnormality is sensed, the abnormality sensing signal is outputted to the test drive command output block 70F, as shown in FIG. 6. Then, when the test drive command output block 70F receives the abnormality signal, the output of the test drive command signal to the turning actuator is prohibited.

At step S15, it is judged that the steering device is in the normal state since the abnormality is not sensed. The initial adjustment process is performed. In this embodiment, the steering device is the steer-by-wire type. Accordingly, the turning actuator is operated by the abnormality diagnosis process. Consequently, it is expected that the turning angle of the steered wheels and the steering angle of the steering wheel 49 (the rotation angle of the steering shaft 4) are not aligned with each other.

Figure 15:
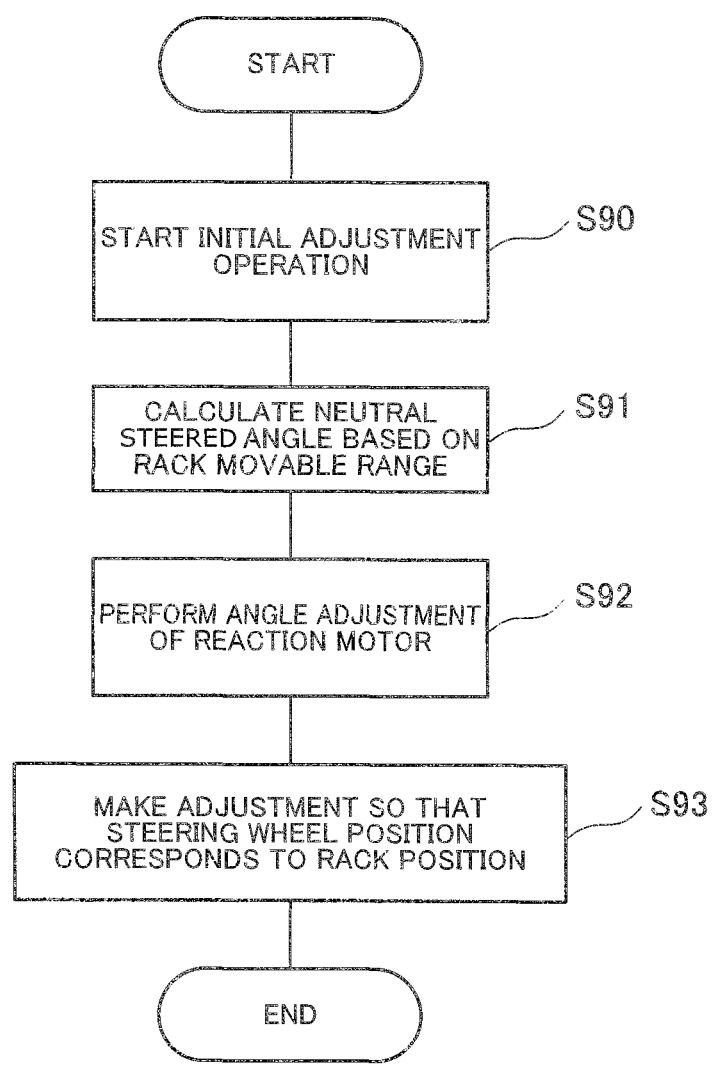
FIG. 15 is a concrete control flowchart of step S15 shown in FIG. 7.

Therefore, the process to align the turning angle of the wheels and the steering angle of the steering wheel 48 (the rotation angle of the steering shaft 4) by the initial adjustment process is performed. The concrete control flow of this initial adjustment process is shown in FIG. 15. The explanations are omitted. After the above-described initial adjustment process is finished, the process proceeds to the end to wait for the next start timing.

In this way, in this embodiment, at the abnormality diagnosis of the steering device, the turning actuator is actually operated. The abnormality diagnosis of the steering device is performed based on this operation. Accordingly, it is also possible to diagnose the operation abnormality other than the abnormality of the circuit system of the controller. Consequently, it is possible to improve the reliability of the steering device. 8

Figure 8:
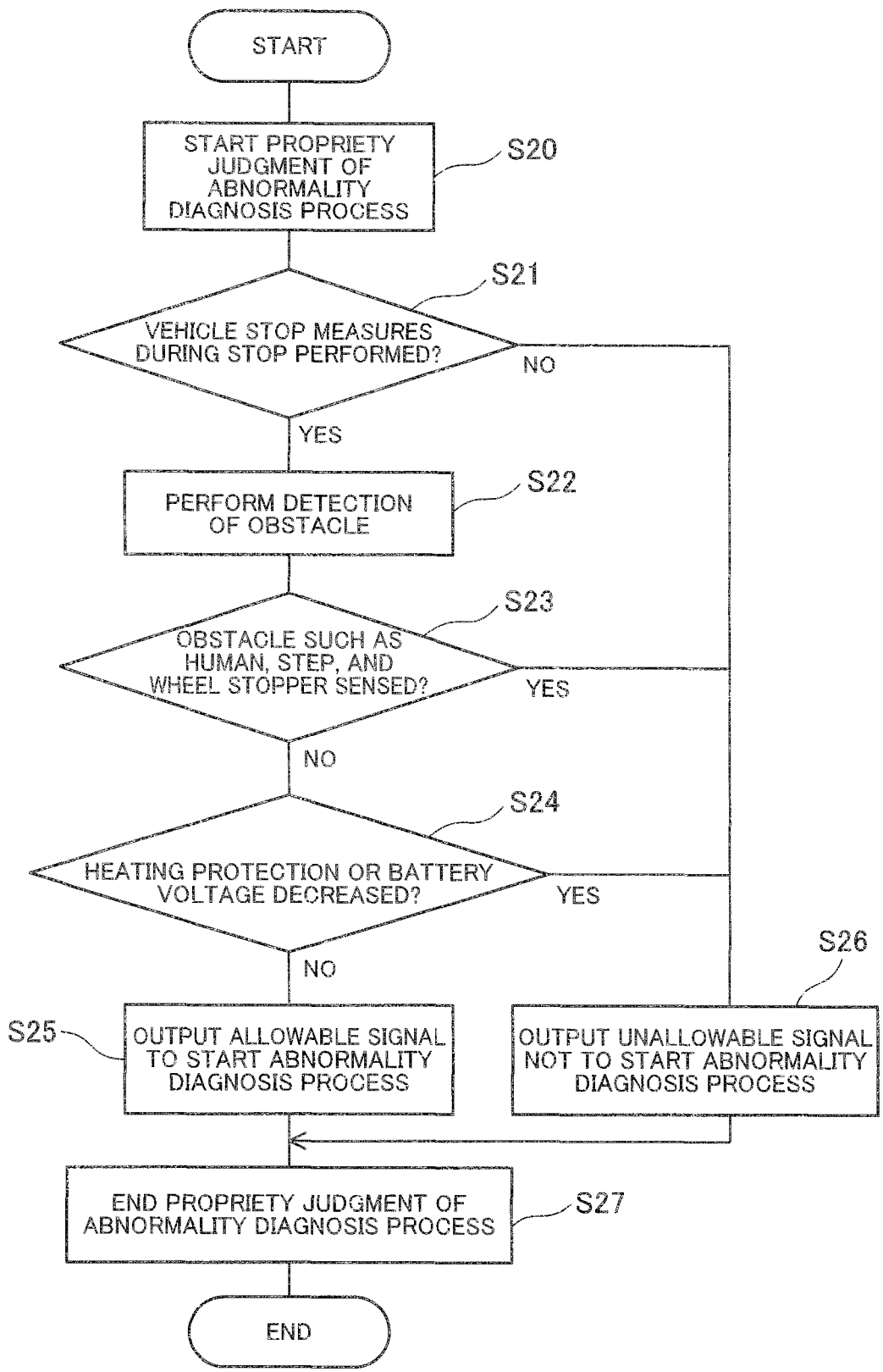
FIG. 8 is a concrete control flowchart of step S10 shown in FIG. 7.

Next, the concrete control flow of step S10 shown in FIG. 7 is explained with reference to FIG. 8.

At step S20, the propriety judgment of the abnormality diagnosis process is started to judge whether or not the circumstance for performing the initial abnormality diagnosis mode is prepared.

At step S21, it is judged whether or not a vehicle stop measures (action) during the vehicle stop is performed. In particular, the following conditions (1) to (3) are judged. (1) The vehicle speed sensor 73 does not sense the vehicle speed. (2) The brake sensor 75 senses the operation of the parking brake. (3) The shift sensor 75 senses the setting of the parking position. When these conditions are satisfied, it is judged that the vehicle stop measures is performed. The process proceeds to step S22.

On the other hand, when at least one of the above-described conditions is not satisfied, it is judged that the vehicle stop measures is not performed. The process proceeds to step S26. At step S26, subsequently to the judgment that the vehicle stop measures is not performed, it is judged that the vehicle travels, or that the vehicle is in a state where the vehicle can travel. The initial abnormality diagnosis mode is not performed so as not to turn the steered wheels. With this, the reliability is improved.

At step S22, subsequently to the judgment that the vehicle stop measures is performed at step S21, the obstacle around the vehicle is sensed. In a case where there is the obstacle such as the step formed at road side end, and the wheel stopper for the parking, it is difficult to turn the steered wheels 47. Accordingly, the obstacle around the vehicle is sensed. Moreover, in a case where the people exist around the steered wheels 47, the steered wheels 47 may contact against the foot.

Therefore, the obstacle around the steered wheels 47 needs to be sensed. The obstacle is sensed and recognized by analyzing the image taken by the sensor camera 74. After the sensing of the obstacle, the process proceeds to step S23.

At step 23, it is judged whether or not there is the obstacle from the taken image. As described above, the obstacle is recognized by the image analyzing (pattern analyzing and motion analyzing). When the obstacle is recognized, the process proceeds to step S26. When the obstacle is not recognized, the process proceeds to step S24. At step S26, the initial abnormality diagnosis mode is not performed since the obstacle exists. The output of the test drive command signal is prohibited so as not turn the steered wheels 47.

In this way, it is sensed whether or not there is the obstacle around the steered wheels 47 before the steered wheels 47 are turned in response to the test drive command signal by the step S12 of FIG. 7. With this, it is possible to judge whether or not the initial abnormality diagnosis mode is performed. Moreover, it is possible to improve the safety.

At step S24, the process does not proceeds to the initial abnormality diagnosis mode when it is judged that the inverter drive circuit 54 is heated to shift to the protection mode by the temperature sensed by the temperature sensor 78, and when the battery voltage sensed by the power source voltage sensor 77 is smaller than the predetermined value.

Accordingly, when the inverter drive circuit 54 is shifted to the protection mode, and when the battery voltage is smaller than the predetermined value, the process proceeds to step S26. When the inverter drive circuit 54 is not shifted to the protection mode, and when the battery voltage is not smaller than the predetermined value, the process proceeds to step S25.

In a case where the turning actuator is driven when the abnormality of the decrease of the power source voltage of the battery 64, or the protection mode of the inverter drive circuit 54 is generated, these abnormalities may be deteriorated. Accordingly, the output of the test drive command signal is prohibited at step S26. With this, it is possible to protect the steering device and the battery 64.

At step S25, an allowable signal to perform the start of the abnormality diagnosis process (the initial abnormality diagnosis mode) is outputted since it is judged that the circumstance of the abnormality diagnosis process is prepared by the judgments of step S21, step S23, and step S24.

At step S26, an unallowable signal not to perform the start of the abnormality diagnosis process (the initial abnormality diagnosis mode) is outputted since it is judged that the circumstance of the abnormality diagnosis process is not prepared by the judgments of step S21, step S23, and step S24.

At step S27, subsequently to the output of the allowable/unallowable signal at step S25 or step S26, the propriety judgment of the abnormality diagnosis process is finished. In this case, when the allowable signal is outputted in step S11 of FIG. 7, the process proceeds to the abnormality diagnosis process at step S12 of FIG. 7. When the unallowable signal is outputted in step S11 of FIG. 7, the abnormality diagnosis process is not performed. The output of the test drive command signal from the test drive command output block 70F is prohibited. The process proceeds to the end to wait for the next start timing.

After the above-described propriety judgment of abnormality diagnosis process is finished, the abnormality diagnosis process at next step S12 is performed. In this case, the test drive command output block 70F of FIG. 6 and the turning actuator are connected by the changeover switch SW. Actually, the diagnosis program is started by the predetermined judgment logic.

Figure 9:
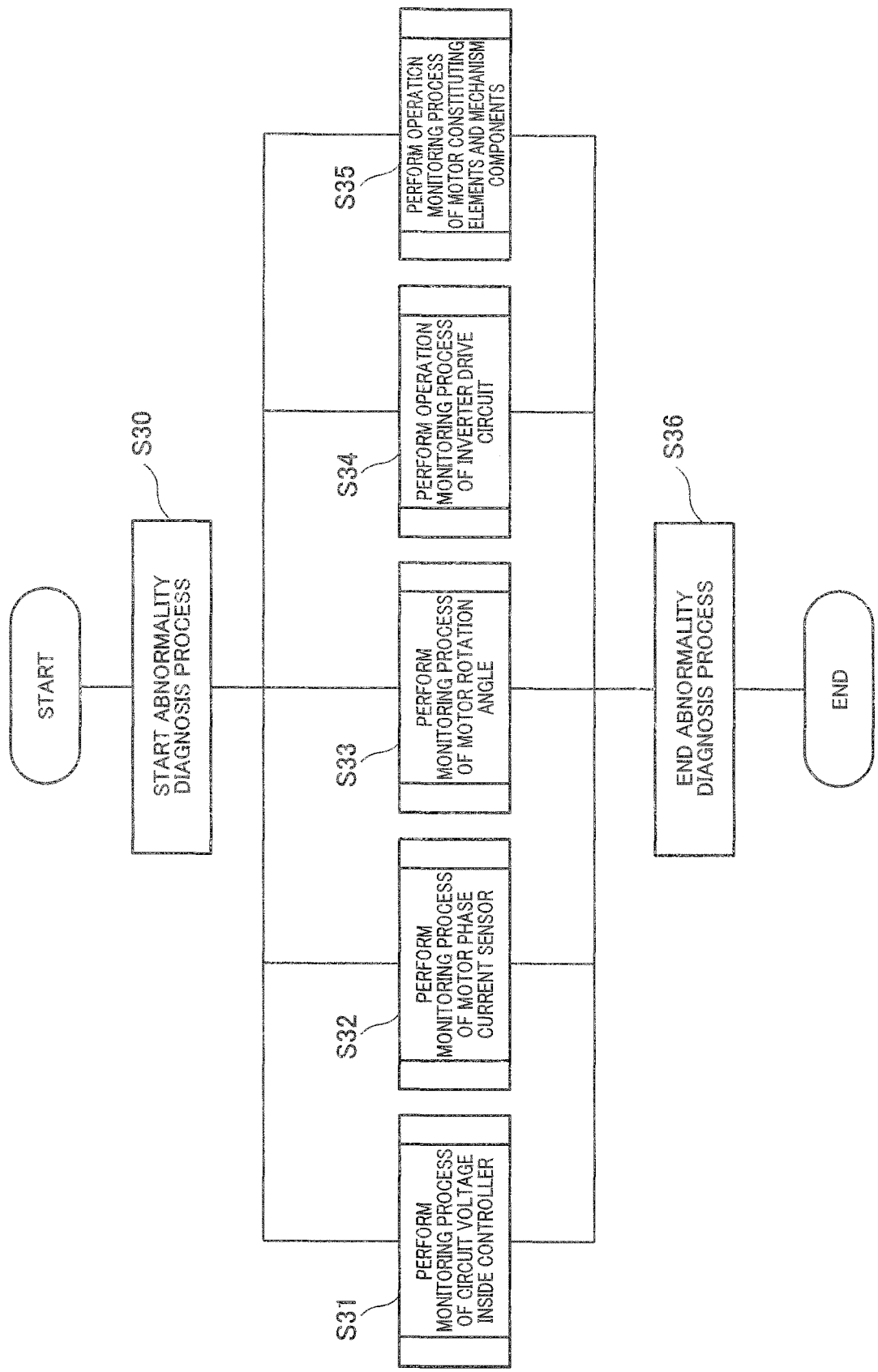
FIG. 9 is a concrete control flowchart of step S12 shown in FIG. 7.

FIG. 9 shows the abnormality diagnosis process. This abnormality diagnosis process is operated in parallel by a multitask method. Accordingly, the turning operations by the test drive command at step S41, S51, S61, S71, and S81 described later are identical to each other. Next, the respective abnormality diagnosis processes are explained.

At step S30, the abnormality diagnosis of the steering device according to the operation of the turning actuator is started.

Figure 10:
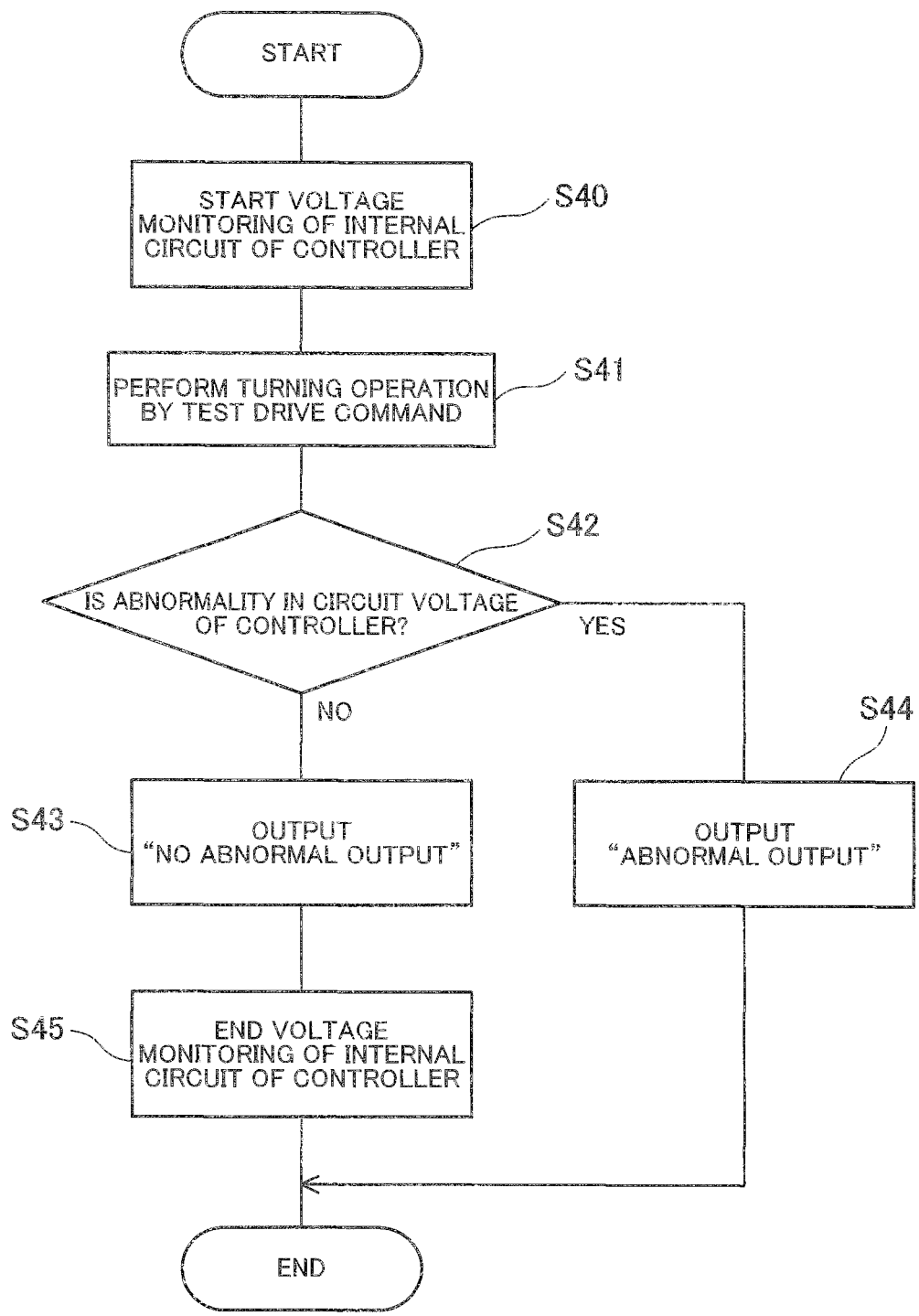
FIG. 10 is a concrete control flowchart of step S31 shown in FIG. 9.

At step S31, the internal voltage monitoring process of the internal circuit in the controller is performed. In this case, the circuit voltage is monitored in a state where the test drive command signal is outputted. Besides, the monitored internal circuit is the voltages of the inverter drive circuit 54, the electric motor 17, and so on. Moreover, it is possible to monitor the voltage of the necessary internal circuit other than above-circuit. Furthermore, the control flow of the internal voltage monitoring process is shown in FIG. 10.

Figure 11:
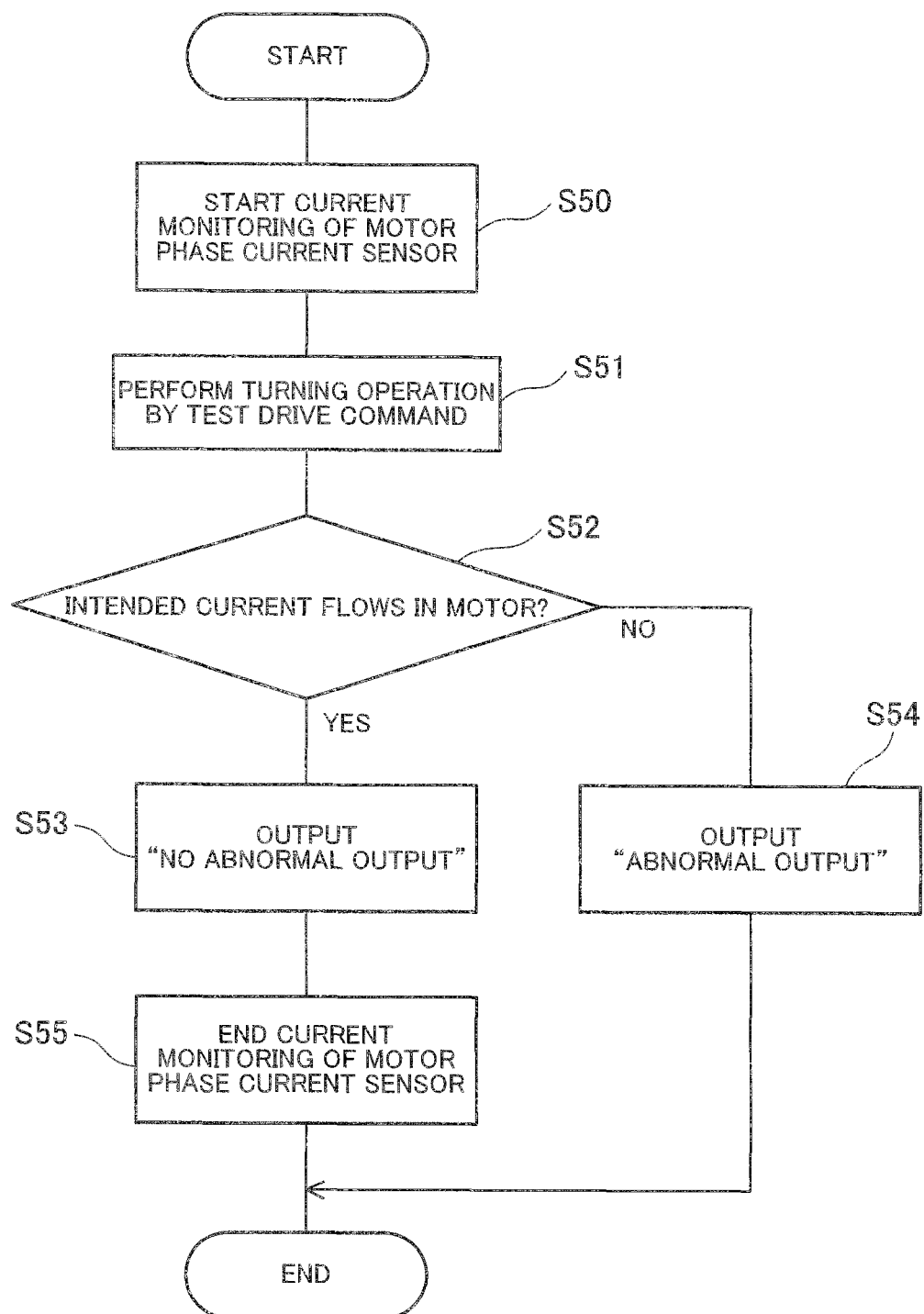
FIG. 11 is a concrete control flowchart of step S32 shown in FIG. 9.

At step S32, the monitoring process of the phase current of the electric motor 17 constituting the turning actuator is performed. Besides, in this case, the phase current of the electric motor 17 is monitored in a state where the test drive command signal is outputted. Moreover, the control flow of this phase current monitoring process is shown in FIG. 11.

Figure 12:
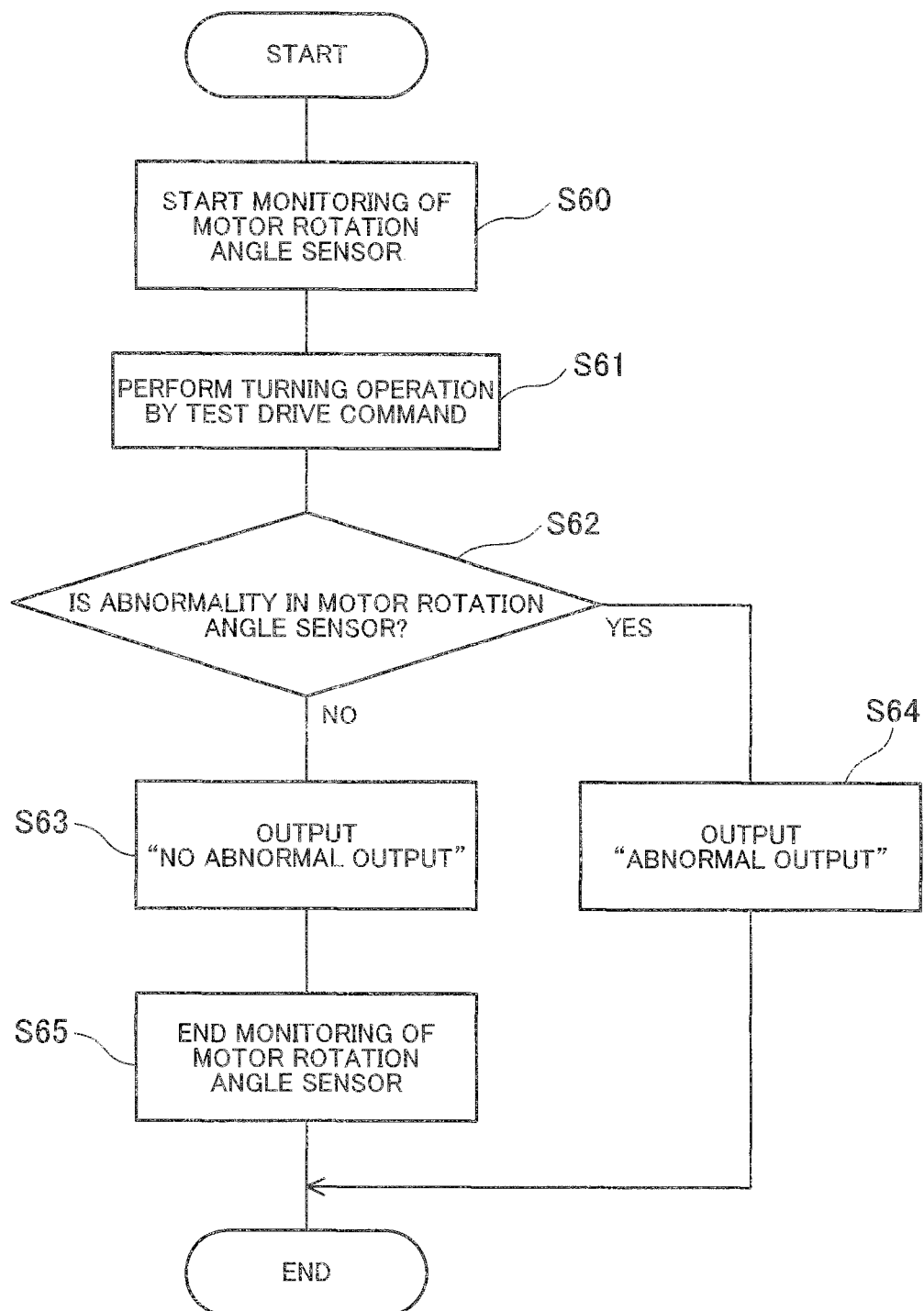
FIG. 12 is a concrete control flowchart of step S33 shown in FIG. 9.

At step S33, the monitoring process of the rotation angle of the electric motor 17 constituting the turning actuator is monitored. Besides, in this case, the rotation angle of the electric motor 17 is monitored in a state where the test drive command signal is outputted. Moreover, this control flow of the rotation angle monitoring process is shown in FIG. 12.

Figure 13:
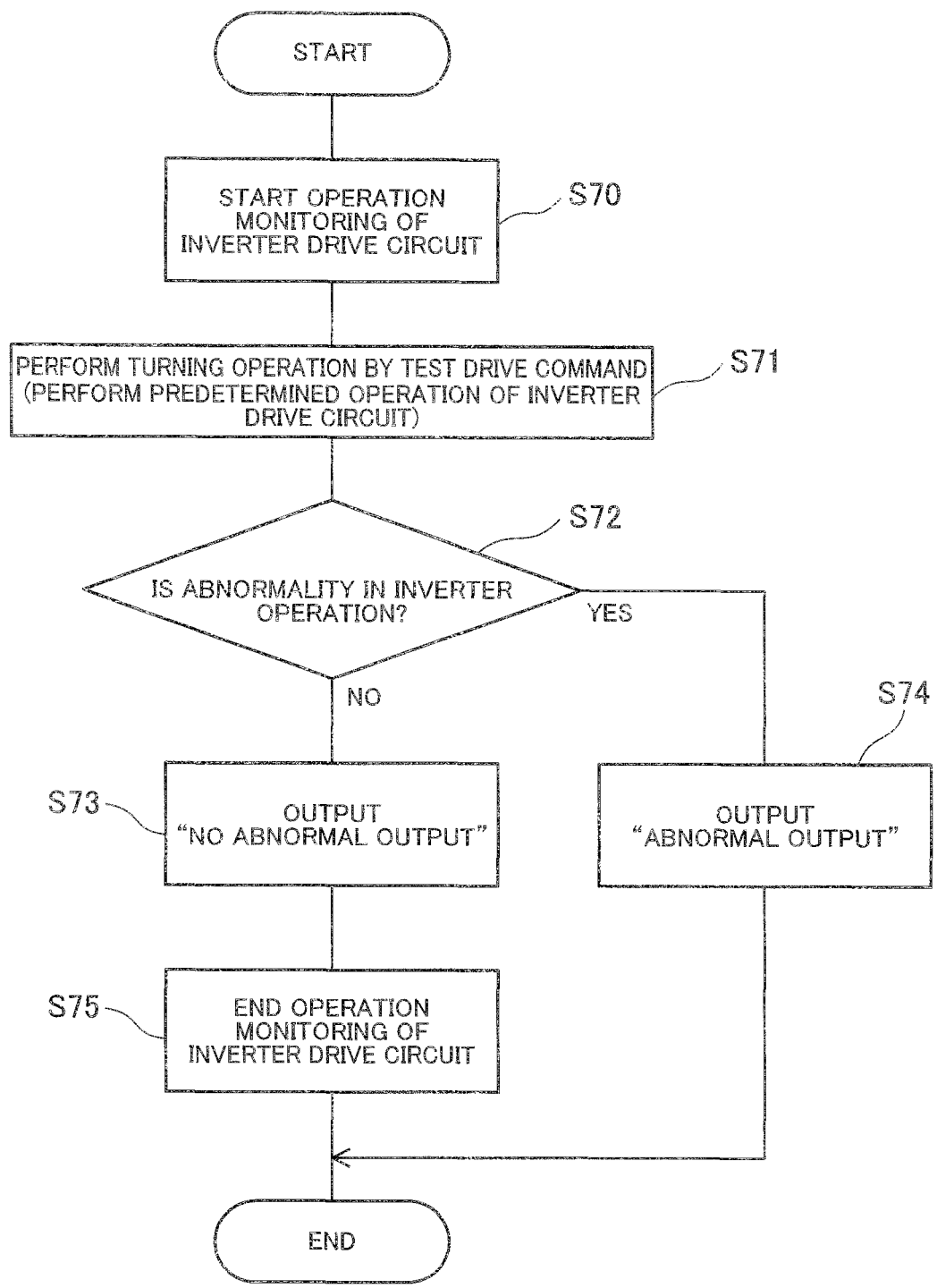
FIG. 13 is a concrete control flowchart of step S34 shown in FIG. 9.

At step S34, the operation monitoring process of the inverter drive circuit 54 arranged to drive the electric motor 17 constituting the turning actuator is performed. Besides, in this case, the operation of the inverter drive circuit 54 of the electric motor 17 is monitored in a state where the test drive command signal is outputted. Moreover, the control flow of the operation monitoring process of the inverter drive circuit 54 is shown in FIG. 13.

Figure 14:
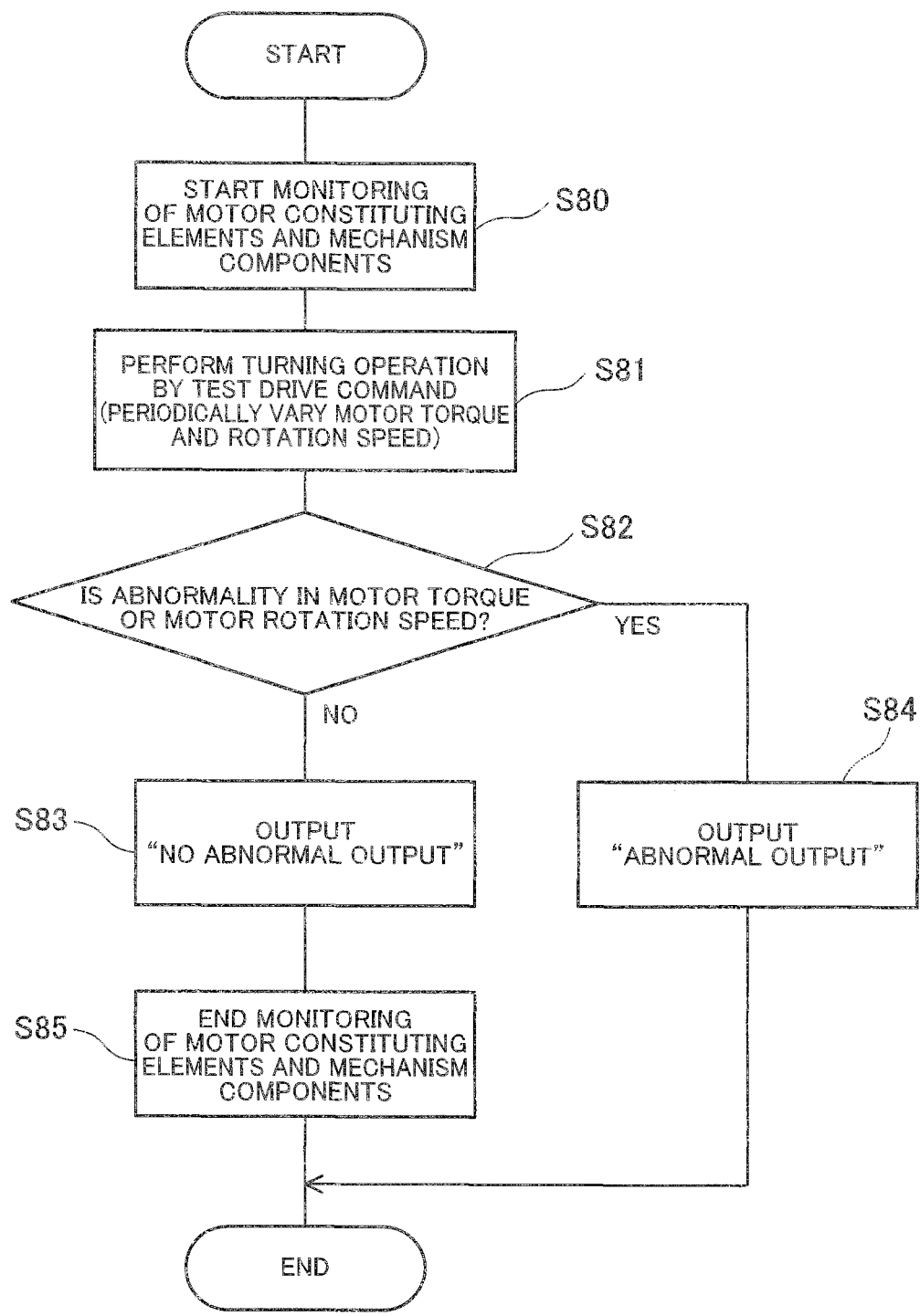
FIG. 14 is a concrete control flowchart of step S35 shown in FIG. 9.

At step S35, the operation monitoring process of the mechanism components, and the constituting elements of the electric motor 17 constituting the turning actuator is performed. In this case, the operation of the mechanism components, and the constituting elements of the electric motor 17 is monitored in a state where the test drive command signal is outputted. Moreover, the control flow of the operation monitoring process of the mechanism components, and the constituting elements of the electric motor 17 is shown in FIG. 14.

At step S36, the abnormality diagnosis operation of the steering device according to the operation of the turning actuator is finished. Then, the process proceeds to step S13 of FIG. 7.

In this case, the above-described respective abnormality diagnosis processes are the multitask method. However, the respective abnormality diagnosis processes may be continuously operated in order. In this case, firstly, at the steps (S41, S51, S61, S71, S81) at which the turning actuator is operated, the physical conditional amounts of the respective diagnosis objects are sensed and stored in the RAM 59. Then, the respective abnormality diagnosis are performed by using these operation conditional amounts.

Next, the respective abnormality diagnosis processes are explained in order of the above-described control steps. These abnormality diagnosis is performed by the drive circuit abnormality diagnosis block 84, the electric motor abnormality diagnosis block 85, and other abnormality diagnosis blocks.

First, FIG. 10 shows details of the voltage monitoring process of the internal circuit of the controller.

At step S40, the voltage monitoring process is started. In this case, in this embodiment, the voltage applied to the electric motor 17 is monitored.

At step S41, the test drive command signal (=the rotation amount of the electric motor) which corresponds to the predetermined steered angle, and which is outputted from the test drive command output block 70F is transferred to the electric motor 17 constituting the turning actuator, so that the steered wheels 47 are turned by a predetermined angle. Besides, the vehicle is stopped in this case, to be "stationary steering state". Accordingly, the frictional resistance between the output side pulley 47 and the road surface is large, so that the electric motor 17 needs the large electric energy.

Therefore, the steered angle is preferable to be as small as possible for decreasing the consumption of the battery 64. The turning operation is performed. The process proceeds to step S42.

At step S42, the voltage sensing circuit 79 is configured to compare the voltage applied to the electric motor 17, and a predetermined voltage threshold value to perform the abnormality diagnosis of the internal circuit. That is, when the internal circuit is operated in the normal state when the test drive output signal is outputted, the voltage applied to the electric motor 17 is maintained in the voltage threshold value of the predetermined range.

On the other hand, when the voltage applied to the electric motor 17 is higher than or smaller than the voltage threshold value of the predetermined range, it is judged that the abnormality is generated in the internal circuit. In this way, it is judged whether or not there is the abnormality of the controller based on the sensed voltage of the voltage sensing circuit 79 according to the operation of the turning actuator corresponding to the test drive command signal. With this, it is possible to perform the high accurate abnormality diagnosis. Besides, the voltage other than the voltage of the electric motor 17 may be sensed. For example, it is possible to perform the abnormality diagnosis by sensing the voltage of the inverter drive circuit, and so on.

Then, when it is judged that the circuit voltage is not in the abnormal state, the process proceeds to step S43. When it is judged that the circuit voltage is in the abnormal state, the process proceeds to step S44.

At step S43, the information of "no abnormal output" is stored in a predetermined address of the RAM 59 based on the judgment result of step S42. After this process, the process proceeds to step S45.

At step S44, the information of "abnormal output" is stored in a predetermined address of the RAM 59 based on the judgment result of step S42. After this process, the process proceeds to step S45.

At step S45, the voltage monitoring process of the internal circuit of the controller is finished.

Next, the phase current monitoring process of the electric motor 17 at step 32 of FIG. 9 is explained. FIG. 11 shows details of the phase current monitoring process of the electric motor 17.

At step S50, the phase current monitoring process of the electric motor 17 is started. In this case, in this embodiment, the current flowing in the coil of the electric motor 17 is monitored.

At step S51, the test drive command signal (=the rotation amount of the electric motor) which corresponds to the predetermined steered angle, and which is outputted from the test drive command output block 70F is transferred to the electric motor 17 constituting the turning actuator, so that the steered wheels 47 is turned by a predetermined angle. Besides, the test drive command signal at this step S51 is identical to the test drive command signal at step S41 of FIG. 10. After the turning operation, the process proceeds to step S52.

At step S52, the current sensing circuit 55 is configured to compare the current flowing in the electric motor 17, and a predetermined current threshold value, so as to perform the abnormality diagnosis. That is, when the controller is normally operated in the state where the test drive output signal is outputted, the current applied to the electric motor 17 is maintained in the current threshold value of the predetermined range. In this case, the current threshold value is the current command value based on the test drive command signal outputted from the test drive command output block 70F.

On the other hand, when the current flowing in the electric motor 17 is higher than or lower than the current threshold value of the predetermined range, it is judged that the abnormality is generated in the controller. In this way, the abnormality of the controller is judged based on the sensed current of the current sensing circuit 55 according to the operation of the turning actuator corresponding to the test drive command signal. With this, it is possible to perform the high accurate abnormality diagnosis.

Then, when it is judged that the abnormality is not in the current value, the process proceeds to step S53. When it is judged that the abnormality is in the current value, the process proceeds to step S54.

At step S53, the information of "no abnormal output" is stored in a predetermined address of the RAM 59 based on the judgment result of step S52. After this process, the process proceeds to step S55.

At step S54, the information of "abnormal output" is stored in a predetermined address of the RAM 59 based on the judgment result of step S52. After this process, the process proceeds to step S55.

At step S55, the phase current monitoring process of the electric motor 17 is finished.

Next, the rotation angle monitoring process of the electric motor 17 at step 33 of FIG. 9 is explained. FIG. 12 shows details of the rotation angle monitoring process of the electric motor 17.

At step S60, the monitoring process of the motor rotation angle sensor of the electric motor 50 is started. In this case, in this embodiment, the rotation angle of the rotor of the electric motor 17 is monitored.

At step S61, the test drive command signal (=the rotation amount of the electric motor) which corresponds to the predetermined steered angle, and which is outputted from the test drive command output block 70F is transferred to the electric motor 17 constituting the turning actuator, so that the steered wheels 47 is turned by a predetermined angle. Besides, the test drive command signal at this step S61 is identical to the test drive command signal at step S41 of FIG. 10. After the turning operation, the process proceeds to step S62.

At step S62, the rotation angle sensing circuit 56 is configured to compare the rotation angle of the electric motor 17, and a predetermined rotation angle threshold value, so as to perform the abnormality diagnosis. That is, when the controller is normally operated in the state where the test drive output signal is outputted, the rotation angle of the electric motor 17 is maintained in the rotation angle threshold value of the predetermined range. In this case, the rotation angle threshold value is the rotation angle command value based on the test drive command signal outputted from the test drive command output block 70F.

On the other hand, when the rotation angle of the electric motor 17 is higher than or lower than the rotation angle threshold value of the predetermined range, it is judged that the abnormality is generated in the electric motor 17 or the motor rotation angle sensor 66. In this way, the abnormality of the electric motor 17 or the motor rotation angle sensor 66 is judged based on the sensed rotation angle of the rotation angle sensing circuit 56 arranged to sense the rotation angle of the rotor of the electric motor 17 according to the operation of the turning actuator corresponding to the test drive command signal. With this, it is possible to perform the high accurate abnormality diagnosis.

Then, when it is judged that the abnormality is not in the rotation angle, the process proceeds to step S63. When it is judged that the abnormality is in the rotation angle, the process proceeds to step S64.

At step S63, the information of "no abnormal output" is stored in a predetermined address of the RAM 59 based on the judgment result of step S62. After this process, the process proceeds to step S65.

At step S64, the information of "abnormal output" is stored in a predetermined address of the RAM 59 based on the judgment result of step S62. After this process, the process proceeds to step S65.

In this way, it is judged whether or not the electric motor 17 is in the abnormal state based on the output of the motor rotation angle sensor 66 according to the operation of the turning actuator corresponding to the test drive command signal. With this, it is possible to perform higher accurate abnormal diagnosis.

Moreover, the abnormal diagnosis is performed that the abnormality is generated in the electric motor 17 including the motor rotation angle sensor 66 when the difference between the rotation angle of the electric motor 17 which is to be obtained by the test drive command signal, and the sensed rotation angle of the motor rotation angle sensor is equal to or greater than the predetermined value.

Moreover, as explained in FIG. 5, the motor rotation angle sensor 66 is the double system. Accordingly, for example, when a difference between the output of the first motor rotation angle sensor and the output of the second motor rotation angle sensor is equal to or greater than a predetermined value, the abnormality diagnosis is performed that the abnormality is generated in the motor rotation angle sensor 66.

At step S65, the monitoring process of the motor rotation angle sensor 66 is finished.

Next, the monitoring process of the inverter drive circuit at step 34 is explained. FIG. 13 shows details of the monitoring process of the inverter drive circuit.

At step S70, the monitoring process of the inverter drive circuit is started. In this case, in this embodiment, the ON/OFF state (ON failure or OFF failure) of the MOSFET of the inverter drive circuit is monitored.

At step S71, the test drive command signal (=the rotation amount of the electric motor) which corresponds to the predetermined steered angle, and which is outputted from the test drive command output block 70F is transferred to the electric motor 17 constituting the turning actuator, so that the steered wheels 47 is turned by a predetermined angle. Besides, the test drive command signal at this step S71 is identical to the test drive command signal at step S41 of FIG. 10. After the turning operation, the process proceeds to step S72.

At step S72, the MOSFET operation diagnosis circuit 80 provided to the inverter drive circuit 54 is configured to monitor the operation of the MOSFET of the inverter drive circuit 54. That is, the MOSFET operation diagnosis circuit 80 is configured to sense the abnormality in which the operation of the MOSFET is in the OFF state though the operation of the MOSFET is the ON state in the normal operation, and the abnormality in which the operation of the MOSFET is in the ON state though the operation of the MOSFET is the OFF state in the normal operation.

In this way, it is judged whether or not the inverter drive circuit 54 is in the abnormal state based on the diagnosis result of the MOSFET operation diagnosis circuit 80 of the inverter drive circuit 54 according to the operation of the turning actuator corresponding to the test drive command signal. With this, it is possible to perform high accuracy abnormality diagnosis. Moreover, in a case where there is the abnormal operation of the inverter drive circuit 54 by the abnormal state of the internal circuit of the controller, the MOSFET operation diagnosis circuit 80 can sense the abnormality. Furthermore, when it is judged that the abnormality is not in the inverter drive circuit 54 by the signal from the MOSFET operation diagnosis circuit 80, the process proceeds to step S73. When it is judged that the abnormality is in the inverter drive circuit 54, the process proceeds to step S74.

At step S73, the information of "no abnormal output" is stored in a predetermined address of the RAM 59 based on the judgment result of step S72. After this process, the process proceeds to step S75.

At step S74, the information of "abnormal output" is stored in a predetermined address of the RAM 59 based on the judgment result of step S72. After this process, the process proceeds to step S75.

At step S75, the operation monitoring process of the inverter drive circuit 54 is finished.

Next, the operation monitoring process of the mechanism components and the constituting elements of the electric motor at step 35 is explained. FIG. 13 shows details of the operation monitoring process of the mechanism components and the constituting elements of the electric motor.

At step S80, the operation monitoring process of the mechanism components and the constituting elements of the electric motor is started. In this case, in this embodiment, the motor torque and/or the motor rotation speed of the electric motor 17 is monitored. The motor torque is presumed by a predetermined calculation from the current sensed by the current sensing circuit 55. The rotation speed is determined from the rotation angle sensed by the rotation angle sensing circuit 56.

At step S81, the test drive command signal (=the rotation amount of the electric motor) which corresponds to the predetermined steered angle, and which is outputted from the test drive command output block 70F is transferred to the electric motor 17 constituting the turning actuator, so that the steered wheels 47 is turned by a predetermined angle. Besides, the test drive command signal at this step S81 is identical to the test drive command signal at step S41 of FIG. 10. After the turning operation, the process proceeds to step S82.

At step S82, the motor torque is calculated based on the current which flows in the electric motor 17, and which is determined by the current sensing circuit 55. The abnormality diagnosis is performed by comparing this motor torque, and a torque threshold value. That is, in a case where the mechanism components, and the constituting elements of the electric motor are operated in the normal state when the test drive output signal is outputted, the motor torque is within the torque threshold value of the predetermined range. In this case, the torque threshold value is a motor torque determined from the current command value based on the test drive command signal outputted from the test drive command output block 70F.

On the other hand, when the motor torque is greater than or smaller than the torque threshold value of the predetermined range, it is judged that the abnormality is generated in the mechanism components, and the constituting elements of the electric motor.

Moreover, the abnormality diagnosis is performed by comparing the rotation speed of the electric motor 17 which is sensed by the rotation angle sensing circuit 56, and a predetermined rotation speed threshold value. That is, in a case where the mechanism components, and the constituting elements of the electric motor are operated in the normal state when the test drive output signal is outputted, the rotation speed is within the rotation speed threshold value of the predetermined range. In this case, the rotation speed threshold value is the rotation speed determined from the current command value based on the test drive command signal outputted from the test drive command output block 70F.

On the other hand, when the rotation speed is greater than or smaller than the rotation speed threshold value of the predetermined range, it is judged that the abnormality is generated in the mechanism components, and the constituting elements of the electric motor.

For example, when the rust is generated in the ball screw mechanism of the turning actuator, the rotation speed of the electric motor 17 is decreased, and the periodic variation of the rotation speed of the electric motor 17 is generated. Accordingly, it is possible to perform the abnormality diagnosis of the mechanism components, and the constituting elements of the electric motor based on these phenomena.

In this way, it is judged that the abnormality is generated in the mechanism components, and the constituting elements of the electric motor when the motor torque and the rotation speed of the motor is out of the predetermined range.

Moreover, when it is judged that the abnormality is not in the mechanism components, and the constituting elements of the electric motor, the process proceeds to step S83. When it is judged that the abnormality is in the mechanism components, and the constituting elements of the electric motor, the process proceeds to step S84.

At step S83, the information of "no abnormal output" is stored in a predetermined address of the RAM 59 based on the judgment result of step S82. After this process, the process proceeds to step S85.

At step S84, the information of "abnormal output" is stored in a predetermined address of the RAM 59 based on the judgment result of step S82. After this process, the process proceeds to step S85.

At step S85, the operation monitoring process of the mechanism components, and the constituting elements of the electric motor 17 is finished.

Then, after all the abnormality diagnosis processes are finished, when one or more abnormal state is sensed at step S13 of FIG. 7, the process proceeds to step S14. When the abnormal state is not sensed at step S13, the process proceeds to step S15 to perform the initial adjustment process.

At step S14, when the abnormality is sensed, the abnormality sensing signal is outputted to the test drive command output block 70F, as shown in FIG. 6. When the test drive command output block 70F receives the abnormality sensing signal, the test drive command output block 70F is configured to prohibit the output of the test drive command signal to the turning actuator. Moreover, the sensed abnormal state is notified to the outside by the display, the speaker, and so on.

Besides, in the above-described abnormality diagnosis process, in the steps S41, S51, S61, S71, S81, the test drive command signal which corresponds to the predetermined steered angle, and which is outputted from the test drive command output block 70F is transferred to the electric motor 17 constituting the turning actuator, so as to turn the steered wheels 47 by the predetermined angle.

Moreover, the current value (=the motor torque) of the test drive command signal may be periodically varied, as shown in step S81, in addition to the above operation. With this, it is possible to perform the higher accuracy abnormality diagnosis, by monitoring the operation of the turning actuator according to the periodic variation of the current value of the test drive command signal.

Furthermore, the rotation speed of the electric motor may be periodically varied by the test drive command signal.

With this, it is possible to perform the various abnormality detection by periodically varying the rotation speed of the electric motor.

Next, the initial adjustment process is explained with reference to FIG. 15. At the start of the vehicle, it is preferable that the steering angle of the steering wheel (the steering operation input member) 48 corresponds to the steered angle (turning angle) of the steered wheels 47. Accordingly, the initial adjustment process is configured to align the steering angle of the steering wheel 48, and the steered angle of the steered wheels 47 after the abnormality diagnosis of the steering device. At step S90, the initial adjustment process is started. In this embodiment, the steering device is the steer-by-wire type. Accordingly, the turning actuator is operated by the abnormality diagnosis process. Consequently, the steered angle of the steered wheels 47 is not aligned with the steering angle of the steering wheel 48. Therefore, the steered angle of the wheels and the steering angle of the steering wheel 48 are aligned with each other by the initial adjustment process.

At step S91, the neutral steered angle is calculated based on the movable range of the rack bar 5. The steered angle of the steered wheels 47 is sensed by the second steered angle sensor 20B. In this case, it is preferable that the steered wheels are operated between left and right both stroke ends of the rack bar 5 by the regular drive command signal from the drive command output block 70R. With this, by moving the rack bar 5 to the stroke ends, a middle point of the left and right both stroke ends is conceivable as the neutral steered angle of the steered wheels. In this case, the neutral steered angle is a steered angle by which the vehicle can travel straight.

Moreover, the stroke ends means "end portions of screw grooves" formed in the rack bar 5. The "end portions of the screw grooves" are positioned on the both sides of the nut screwed on the rack bar 5. Accordingly, the rack bar 5 is moved to the "end portions of screw grooves" by the rotation of the nut. By operating the rack bar 5 to the both stroke ends, the middle point of the left and right both stroke ends is the neutral steered angle of the steered wheels.

Furthermore, the regular drive command signal can turn the steered wheels 47 to one of the stroke ends of the rack bar 5. In this case, the neutral steered angle is set to a position to which the rack bar 5 is returned from the one of the stroke ends of the rack bar 5 in the neutral turning direction, by a predetermined return amount. The predetermined return amount of the rack bar 5 is previously determined by matching operation and simulation.

Besides, it is possible to obtain the information such as the stroke amount, the strokable range, and the turning load, from the signal relating to the operation of the steered wheels, without using the second steered angle sensor 20B. Moreover, it is possible to sense the steered angle of the steered wheels from a part of the above-described information.

Moreover, the neutral steered angle can be determined at step S41 of the abnormality diagnosis process. The determined neutral steered angle may be stored in the RAM 59.

In the above-described process, after the neutral steered angle of the steered wheels are determined, the process proceeds to step S92. At step S92, the drive command output block 70R of the controller 19 is configured to output the control signal to the steering reaction force motor 49 to align the position of the steering wheel 48 to the neutral steering angle. In this case, the steering wheel 48 is rotated to the neutral steering angle by the steering reaction force motor 49 by comparing the steering angle sensed by the first steering angle sensor 20A, and the neutral steering angle stored in the controller 19.

When the steering wheel 48 is rotated to the neutral steering angle, the process proceeds to step S93. At step S93, the electric motor 17 is operated by the regular drive command signal from the drive command output block 70R to drive the rack bar 5 so that the steered wheels 47 are brought to the neutral steered (turning) angle determined at step S91. Then, when the second steered angle sensor 20B senses that the steered wheels 47 reach the neutral steered angle, the operation of the electric motor 17 is stopped. With this, the steering angle 48 and the steered wheels 47 are brought to the neutral steering angle and the neutral steered angle.

In this way, at the start of the vehicle, the steering wheel 48 and the steered wheels 47 are both the neutral steering angle and the neutral steered angle. Accordingly, at the start of the vehicle, it is unnecessary to drive the steered wheels 47 and the steering wheel 48. It is possible to suppress the unnatural feeling of the driver. Moreover, the vehicle is not turned at the start of the vehicle. Accordingly, it is advantageous in the safety.

Besides, in the above-described explanations, the steering wheel 48 and the steered wheels 47 are controlled to be aligned at the neutral steering angle. The present invention is not limited to this. The turning angle of the steered wheels 47 may be adjusted in accordance with the steering angle of the steering wheel 48. The steering angle of the steering wheel 48 may be adjusted in accordance with the steered angle of the steered wheels 47.

Moreover, as shown in FIG. 3, the steering wheel 48 is not mechanically connected to the rack bar 5. Even in a case where the turning actuator is controlled and driven by the test drive command signal so as to drive the rack bar 5, the steering wheel 48 is not rotated. Accordingly, it is possible to suppress the unnatural feeling to the driver at the abnormality diagnosis.

Moreover, in the configuration where the front wheels FW and the rear wheels RW are turned in the same direction as shown in FIG. 4B, it is possible to decrease the motion of the vehicle in the turning direction, and to improve the safety of the vehicle, and the safety around the vehicle, during the abnormality diagnosis of the steering device.

On the other hand, in the configuration where the front wheels FW and the rear wheels RW are turned in the opposite directions as shown in FIG. 4C, it is possible to decrease the motion of the position of the center of gravity of the vehicle, and to stabilize the motion of the vehicle during the abnormality diagnosis of the steering device.

As described above, in the present invention, the turning actuator drive command signal output section is configured to output the test drive signal. The turning actuator operation signal input section is configured to sense the operation state signal relating to the operation of the turning actuator. The abnormality diagnosis section is configured to judge whether or not the steering device is in the abnormal state based on the operation state signal relating to the operation of the turning actuator with respect to the test drive command signal.

With this, the turning actuator is actually operated by the test command signal. The abnormality diagnosis of the steering device is performed based on that operation. Accordingly, it is possible to sense the abnormal state other than the abnormal state of the controller.

A steering device according to the embodiments of the present invention includes:

a turning mechanism including a turning member (5), and a turning actuator (17, 18) arranged to turn steered wheels (47, 47) of a vehicle through the turning member based on a turning actuator drive command signal;

a controller (19) including a turning actuator drive command signal output section (70), a turning actuator operation signal input section (71), and an abnormality diagnosis section (72), the turning actuator drive command signal output section (70) being configured to output the turning actuator drive command signal, the turning actuator drive command signal including a drive command signal for the turning, and a test drive command signal for an abnormality detection, the drive command signal being outputted to the turning actuator to turn the steered wheels when the vehicle is in a first state, the test drive command signal being outputted to the turning actuator to turn the steered wheels when the vehicle is in a second state, the turning actuator operation signal input section (71) being configured to receive a signal relating to the operation of the turning actuator, and the abnormality diagnosis section (72) being configured to judge whether or not the steering device is in an abnormal state, based on the signal relating to the operation of the turning actuator with respect to the test drive command signal.

Accordingly, when the abnormality diagnosis of the steering device is performed, the steered wheels are actually operated. The abnormality diagnosis of the turning actuator is performed based on that operation. Consequently, it is possible to sense the abnormality of the turning actuator other than the abnormality of the controller, and to improve the reliability of the steering device.

The entire contents of Japanese Patent Application No. 2018-164990 filed Sep. 4, 2018 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A steering device comprising:
a turning mechanism including a turning member, and a turning actuator arranged to turn steered wheels of a vehicle through the turning member based on a turning actuator drive command signal;
a controller including a turning actuator drive command signal output section, a turning actuator operation signal input section, and an abnormality diagnosis section,
the turning actuator drive command signal output section being configured to output the turning actuator drive command signal,
the turning actuator drive command signal including a drive command signal for the turning, and a test drive command signal for an abnormality detection,
the drive command signal being outputted to the turning actuator to turn the steered wheels when the vehicle is in a first state,
the test drive command signal being outputted to the turning actuator to turn the steered wheels when the vehicle is in a second state,
the turning actuator operation signal input section being configured to receive a signal relating to the operation of the turning actuator, and
the abnormality diagnosis section being configured to judge whether or not the steering device is in an abnormal state, based on the signal relating to the operation of the turning actuator with respect to the test drive command signal.

2. The steering device as claimed in claim 1, wherein the steering device includes a steering input mechanism including a steering operation input member, and a steering amount sensor; the steering operation input member is not mechanically connected to the turning member; the steering amount sensor is arranged to output an operation amount signal relating to an operation amount of the steering operation input member by a driver; and the turning actuator drive command signal is produced by the operation amount signal.

3. The steering device as claimed in claim 2, wherein the second state is from a timing at which a start switch of the vehicle is brought to an ON state, to a timing before the vehicle starts to travel.

4. The steering device as claimed in claim 3, wherein the second state is from the timing at which the start switch of the vehicle is brought to the ON state, to a timing at which a driver rides on the vehicle.

5. The steering device as claimed in claim 3, wherein the controller includes an abnormality information output section; and when the abnormality diagnosis section judges that the steering device is in the abnormal state, the abnormality information output section is configured to output a signal relating to the abnormality of the steering device, to devices which are other than the steering device, and which are mounted on the vehicle.

6. The steering device as claimed in claim 2, wherein the drive command signal is for driving the turning angle actuator so that a steered angle of the steered wheels becomes an angle corresponding to a position of the steering operation input member.

7. The steering device as claimed in claim 2, wherein the controller includes a steered angle sensing section; and the steered angle sensing section is configured to sense the steered angle of the steered wheels based on a the signal relating to the operation of the turning actuator with respect to the test drive command signal.

8. The steering device as claimed in claim 7, wherein the steering input mechanism includes a steering input mechanism actuator; and the steering input mechanism actuator is arranged to adjust a position of the steering operation input member based on the steered angle sensed by the steered angle sensing section.

9. The steering device as claimed in claim 7, wherein the test drive command signal is for operating the steered wheels to left and right stroke ends of the steered wheels.

10. The steering device as claimed in claim 7, wherein the test drive command signal is for operating the steered wheels to one of left and right stroke ends of the steered wheels.

11. The steering device as claimed in claim 2, wherein the controller includes an obstacle sensing section; and the obstacle sensing section is configured to sense an obstacle around the steered wheels before the turning actuator drive command signal output section outputs the test drive command signal.

12. The steering device as claimed in claim 11, wherein the turning actuator drive command signal output section is configured to prohibit the output of the test drive command signal when the obstacle sensing section senses the obstacle.

13. The steering device as claimed in claim 2, wherein the turning actuator drive command signal output section is configured to prohibit the output of the test drive command signal when a stop measures of the vehicle is not performed.

14. The steering device as claimed in claim 2, wherein the controller includes an inverter drive circuit;
the inverter drive circuit is configured to receive an electric power from a battery mounted on the vehicle, and to control and drive an electric motor constituting the turning actuator;
the abnormality diagnosis section includes a drive circuit abnormality diagnosis section;
the drive circuit abnormality diagnosis section is configured to judge that the battery or the inverter drive circuit is in the abnormal state when a voltage of the battery is equal to or smaller than a predetermined value, or when a temperature of the inverter drive circuit is equal to or greater than a predetermined value; and
when the drive circuit abnormality diagnosis section judged that the battery or the inverter drive circuit is in the abnormal state, the turning actuator drive command signal output section is configured to prohibit the output of the test drive command signal.

15. The steering device as claimed in claim 2, wherein the steering device includes a rear wheel steering mechanism; the steered wheels are front wheels of the vehicle; the rear wheel steering mechanism is arranged to turn rear wheels of the vehicle; and the test drive command signal is outputted to the turning actuator so that the steered wheels and the rear wheels are turned in a same direction when the vehicle is in the second state.

16. The steering device as claimed in claim 2, wherein the steering device includes a rear wheel steering mechanism; the steered wheels are front wheels of the vehicle; the rear wheel steering mechanism is arranged to turn rear wheels of the vehicle; and the test drive command signal is outputted to the turning actuator so that the steered wheels and the rear wheels are turned in opposite directions when the vehicle is in the second state.

17. The steering device as claimed in claim 1, wherein the controller includes an electric motor, an inverter drive circuit, and a current sensor;
the inverter drive circuit is configured to receive an electric power from a battery mounted on the vehicle, and to control and drive an electric motor;
the current sensor is configured to sense a current value of the electric motor;
the abnormality diagnosis section includes a drive circuit abnormality diagnosis section; and
the drive circuit abnormality diagnosis section is configured to judge whether or not the controller is in the abnormal state based on the current value when the test drive command signal is outputted.

18. The steering device as claimed in claim 1, wherein the controller includes an inverter drive circuit, and a voltage sensing section;
the inverter drive circuit is configured to receive an electric power from a battery mounted on the vehicle, and to control and drive an electric motor constituting the turning actuator;
the voltage sensing section is configured to sense a voltage value of the electric motor;
the abnormality diagnosis section includes a drive circuit abnormality diagnosis section; and
the drive circuit abnormality diagnosis section is configured to judge whether or not the controller is in the abnormal state based on the voltage value when the test drive command signal is outputted.

19. The steering device as claimed in claim 1, wherein the turning actuator includes an electric motor;
the electric motor includes a motor rotation angle sensor arranged to sense a rotation position of a rotor of the electric motor;
the abnormality diagnosis section includes an electric motor abnormality diagnosis section; and
the electric motor abnormality diagnosis section is configured to judge whether or not the electric motor is in the abnormal state based on an output signal of the motor rotation angle sensor when the test drive command signal is outputted.

20. The steering device as claimed in claim 19, wherein the motor rotation angle sensor includes a first motor rotation angle sensor and a second motor rotation angle sensor; and
the electric motor abnormality diagnosis section is configured to compare an output signal of the first rotation angle sensor, and an output signal of the second rotation angle sensor, and thereby to judge whether or not the motor rotation angle sensor is in the abnormal state.

21. The steering device as claimed in claim 19, wherein the electric motor abnormality diagnosis section is configured to compare the test drive command signal and the output signal of the motor rotation angle sensor, and thereby to judge whether or not the motor rotation angle sensor is in the abnormal state.

22. The steering device as claimed in claim 19, wherein the electric motor abnormality diagnosis section is configured to judge whether or not the motor rotation angle sensor is in the abnormal state, based on a rotation speed of the electric motor which is produced from the output signal of the motor rotation angle sensor.

23. The steering device as claimed in claim 1, wherein the controller includes an inverter drive circuit;
the inverter drive circuit is configured to receive an electric power from a battery mounted on the vehicle, and to control and drive an electric motor constituting the turning actuator;
the abnormality diagnosis section includes a drive circuit abnormality diagnosis section; and
the drive circuit abnormality diagnosis section is configured to judge whether or not the inverter drive circuit is in the abnormal state based on an operation state of the inverter drive circuit when the test drive command signal is outputted.

24. The steering device as claimed in claim 1, wherein a current value of the test drive command signal is periodically varied.

25. The steering device as claimed in claim 24, wherein the turning actuator includes an electric motor; and the test drive command signal is for periodically varying a rotation speed of the electric motor.

* * * * *